(12) United States Patent
Park et al.

(10) Patent No.: US 9,996,308 B2
(45) Date of Patent: Jun. 12, 2018

(54) TETHERING TYPE HEAD MOUNTED DISPLAY AND METHOD FOR CONTROLLING THE SAME

(71) Applicant: LG ELECTRONICS INC., Seoul (KR)

(72) Inventors: Cheongha Park, Seoul (KR); Goeun Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/284,931

(22) Filed: Oct. 4, 2016

(65) Prior Publication Data

US 2017/0123744 A1 May 4, 2017

(30) Foreign Application Priority Data

Nov. 2, 2015 (KR) .......................... 10-2015-0153286

(51) Int. Cl.
*G06F 3/14* (2006.01)
*G06F 3/01* (2006.01)
*G09G 5/00* (2006.01)
G06F 3/0482 (2013.01)
G06F 3/0484 (2013.01)
G06T 11/00 (2006.01)
G09G 5/30 (2006.01)

(52) U.S. Cl.
CPC ................ *G06F 3/14* (2013.01); *G06F 3/012* (2013.01); *G06F 3/013* (2013.01); *G09G 5/003* (2013.01); *G06F 3/0482* (2013.01); *G06F 3/04847* (2013.01); *G06T 11/001* (2013.01); *G09G 5/30* (2013.01); *G09G 2370/00* (2013.01)

(58) Field of Classification Search
CPC ........ G06F 3/012; G06F 3/013; G06F 3/0482; G06F 3/04847; G06F 3/14; G06T 11/001; G09G 2370/00; G09G 5/003; G09G 5/30
See application file for complete search history.

(56) References Cited

U.S. PATENT DOCUMENTS

| | | | |
|---|---|---|---|
| 2007/0237491 A1 | 10/2007 | Kraft | |
| 2013/0021373 A1* | 1/2013 | Vaught | G02B 27/017 345/633 |
| 2014/0364197 A1* | 12/2014 | Osman | A63F 13/00 463/24 |
| 2015/0062022 A1 | 3/2015 | Rabii | |
| 2015/0067580 A1* | 3/2015 | Um | G06F 3/017 715/781 |
| 2017/0038837 A1* | 2/2017 | Faaborg | G06F 3/0482 |

* cited by examiner

*Primary Examiner* — Latanya Bibbins
(74) *Attorney, Agent, or Firm* — KED & Associates, LLP

(57) ABSTRACT

Provided are a tethering-type head-mounted display (HMD), and a control method thereof. The HMD is in communications with a mobile terminal and includes a display to selectively display content. A sensor detects a state in which the HMD is worn by a user, and the HMD presents notification information about an event detected in the mobile terminal. The controller further pauses, when the sensor senses a change in the state in which the HMD is worn by the user while the notification information is being presented by the display, the presentation of the content, and generates, based on pausing the presentation of the content, bookmark information identifying the content and a point in time when the sensor senses the change in the state in which the HMD is worn by the user.

19 Claims, 12 Drawing Sheets

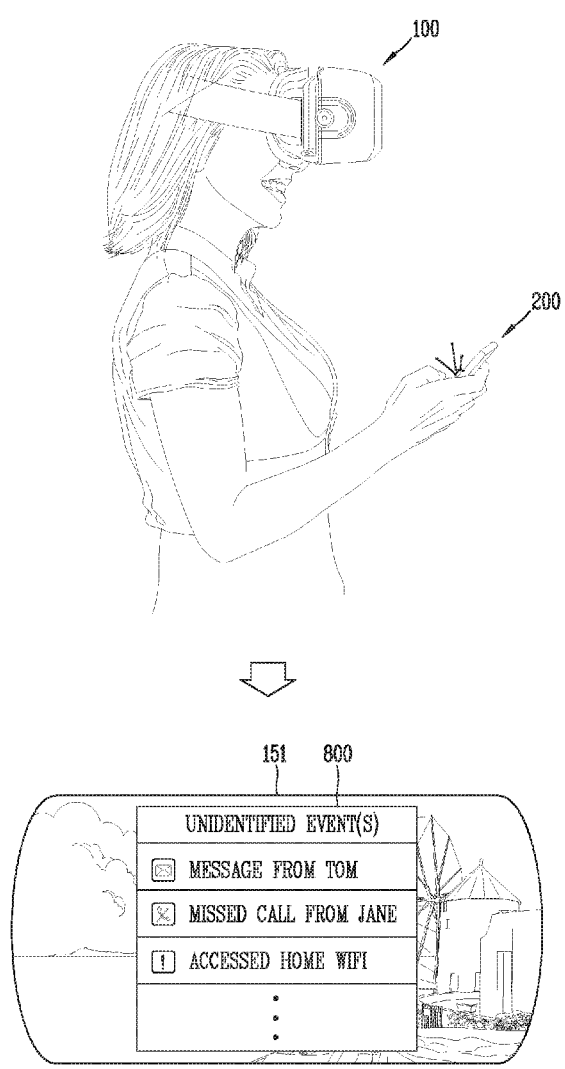

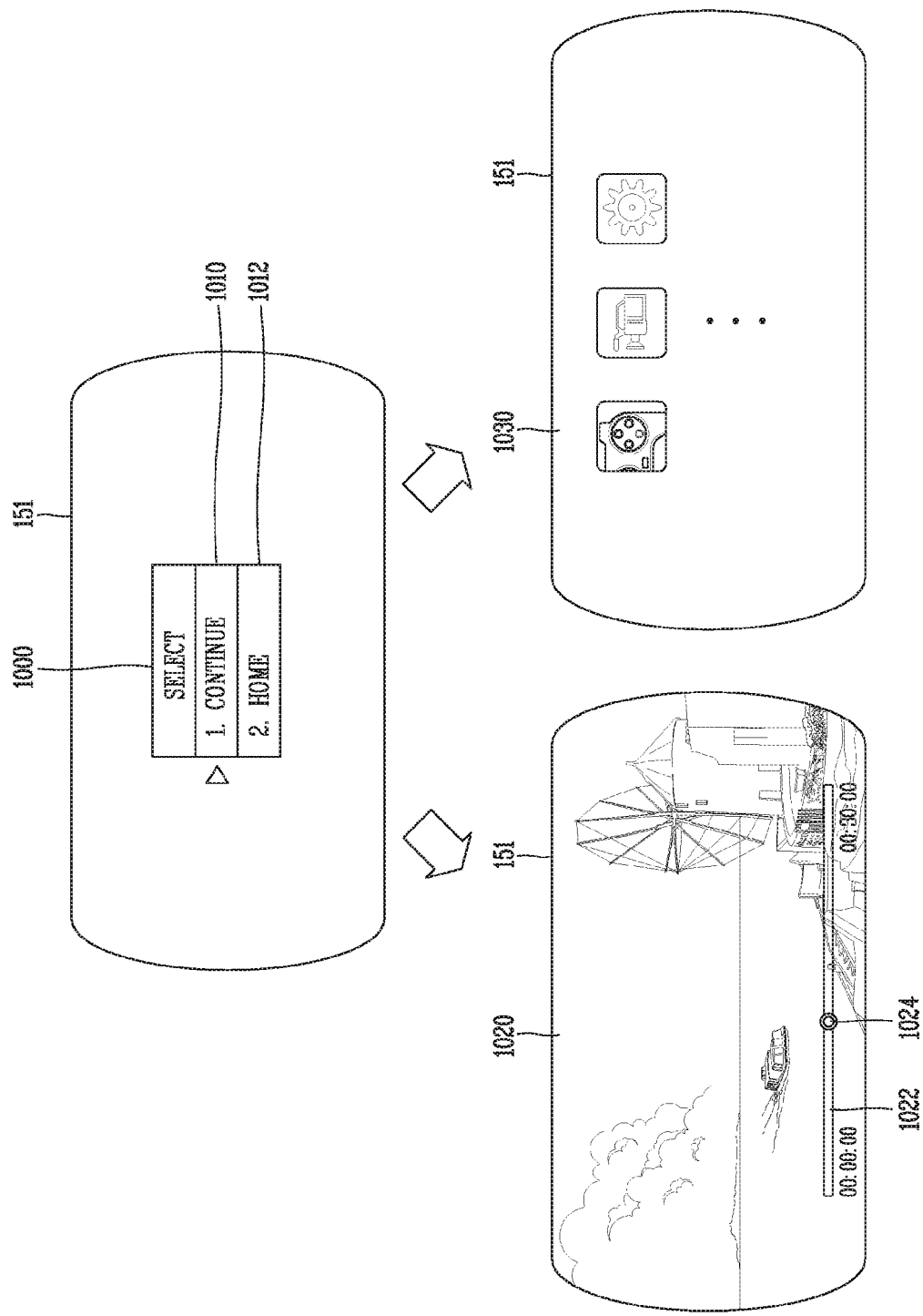

TETHERING TYPE HEAD MOUNTED DISPLAY AND METHOD FOR CONTROLLING THE SAME

CROSS-REFERENCE TO RELATED APPLICATION

This application claims priority under 35 U.S.C. § 119 to Korean Application No. 10-2015-0153286, filed on Nov. 2, 2015, whose entire disclosure is hereby incorporated by reference.

BACKGROUND

1. Field

The present disclosure relates to a tethering-type head-mounted display (HMD) device and a method for controlling the same.

2. Background

Recently, a wearable glass-type terminal configured to be mounted on part of a human body has been developed. Also, a glass-type terminal mounted on a user's head part may be classified as a head-mounted display (HMD).

A HMD refers to a display device which is worn on a user's head part and provides an image directly in front of user's eyes, by which the user may enjoy various-types of video content through an image that is perceived to be much greater than that of a television or other display device. Thus, an HMD offers a user a high level of immersion and entertainment when presenting content, and currently, due to the advancement of various stereoscopic video technologies, an HMD provides a more vivid sense of reality that a flat screen display, such as a television or the like, cannot provide.

Meanwhile, HMDs may be classified according to driving schemes. For example, according to whether a controller receiving a user input is separately provided, HMDs may be classified as a stand-type HMD or a tethering-type HMD. For example, the stand-type HMD may receive various user inputs through an input unit provided in the HMD itself.

Meanwhile, the tethering-type HMD may use a separate device serving as a controller, but the tethering-type HMD may be advantageously linked to the device serving as a controller. For example, the controller may be a smartphone, or the like. In this case, the tethering-type HMD links with the smartphone such that the tethering-type HMD may display data, or the like, stored in the smartphone, or display notification information regarding an event that occurs in the smartphone.

While being capable of providing a maximized sense of immersion when displaying content to a user, the HMD also has some practical limits. For example, the HMD achieves the immersion by providing an image directly before user's eyes, and when the HMD is used for more than a predetermined period of time, the HMD may cause various undesired effects, such as dizziness, amblyopia (i.e., vision in one or more both eyes is reduced), and the like. Thus, an HMD may be programmed with a recommended maximum usage time, and when the HMD is worn by a user for more than the maximum recommended usage time, the user may be informed accordingly, thereby discouraging use of the HMD for more than the recommended maximum usage time.

A user may be instructed to take off the HMD occasionally. For example, the user may be instructed to remove the HMD to (1) receive detailed information regarding an event sensed in the device serving as a controller; is (2) perform a function of a specific controller device related to the event (for example, transmission of a response message, placing a call, and the like); or (3) take a break after the HMD is continuously used for more than the recommended maximum usage time.

However, when the HMD is taken off, viewing of content is inevitably interrupted. Interruption of viewing of content may significantly reduce the user's sense of immersion. Thus, techniques for maintaining the user's sense of immersion when viewing content through an HMD, even when the HMD is occasionally taken off, are being actively researched.

BRIEF DESCRIPTION OF THE DRAWINGS

The embodiments will be described in detail with reference to the following drawings in which like reference numerals refer to like elements wherein:

FIGS. 8A and 8B are views illustrating an example in which when specific notification information is selected in the HMD related to the present disclosure, a controller device is controlled to display an operational screen corresponding to the selected notification information.

FIG. 10 is a view illustrating an example in which when a user wears an HMD related to the present disclosure, a menu screen for selecting continuous playing according to bookmark information or displaying a home screen.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different-types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head-mounted displays (HMDs)), and the like.

Figure 1:
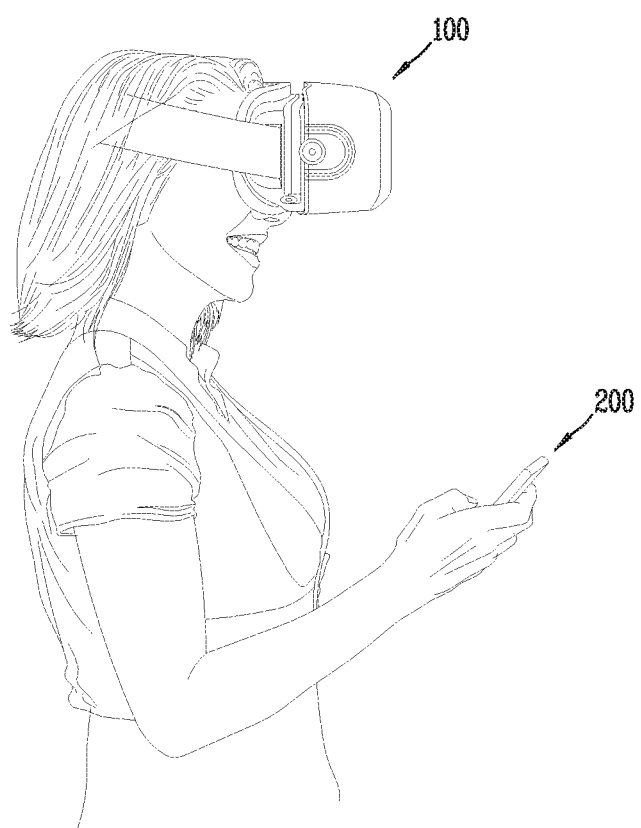
FIG. 1 is a block diagram illustrating a tethering-type HMD related to the present disclosure.

FIG. 1 is a view illustrating an example in which a tethering-type HMD 100 related to the present disclosure is connected to a controller.

As illustrated in FIG. 1, the HMD 100 may be connected to a mobile terminal 200 or other device serving as a separate controller. The HMD 100 may receive a user input through the mobile terminal 200 serving as a controller or may share and use various-types of information and data stored in the mobile terminal 200. Thus, various-types of information related to the mobile terminal 200 serving as a controller may be displayed on the HMD 100, and the user may check events sensed in the mobile terminal 20 serving as a controller, while viewing content through the HMD 100.

Here, the mobile terminal 200 serving as a controller may correspond to various devices. For example, the mobile terminal 200 serving as a controller may be a smartphone or a tablet PC. According to a function that can be provided by the mobile terminal 200 serving as a controller, various-types of information related to the device 200 may be provided to the HMD 100. Thus, as illustrated in FIG. 1, when the mobile terminal 200 is connected to the HMD 100 and serves as a controller, pieces of information related to functions that can be provided through the mobile terminal 200, that is, an e-mail function, a call function, a social network service (SNS) function, a message function such as a short messaging service (SMS) or a multimedia messaging service (MMS), or a function according to various applications installed in the mobile terminal may be displayed through the HMD 100.

Accordingly, the user may check an event that occurs in the mobile terminal 200, that is, call termination, message reception, news of an SNS community, or various-types of state information related to the mobile terminal 200, through the HMD 100.

Figure 2A:
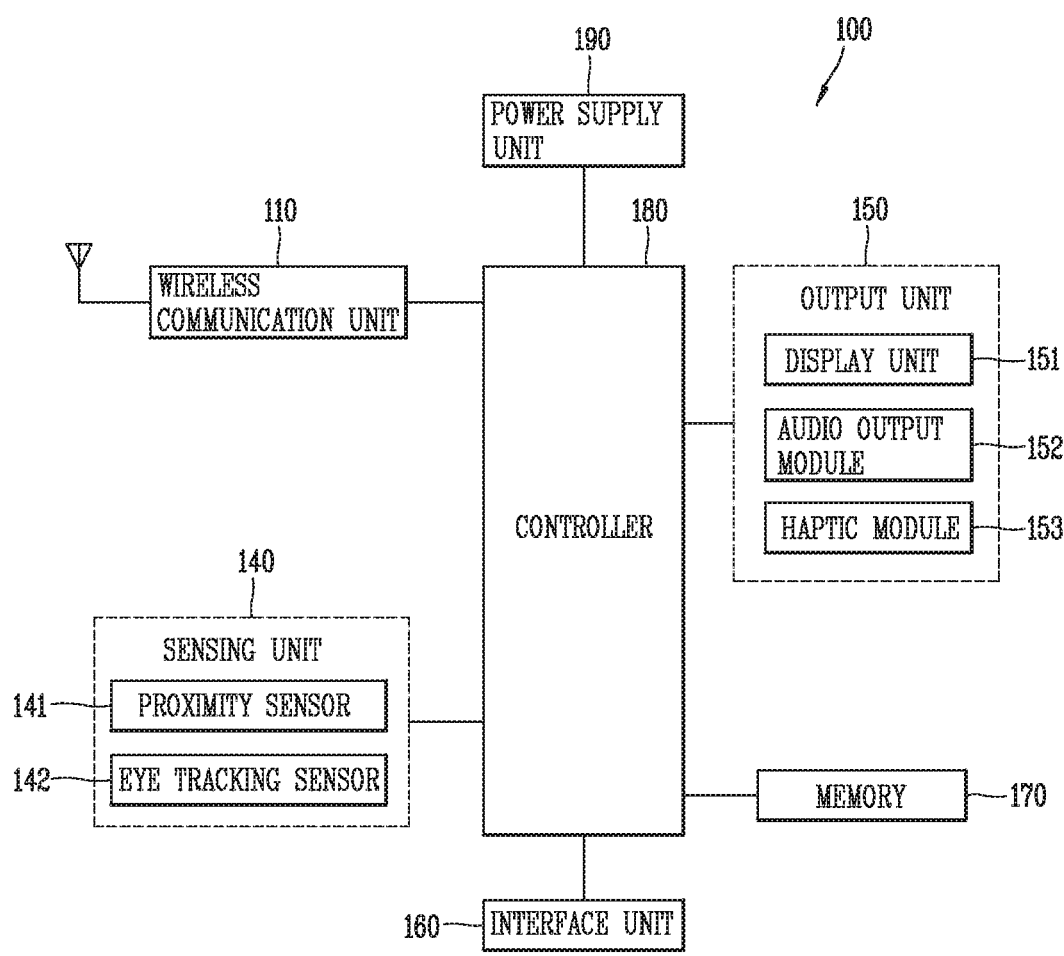
FIGS. 2A and 2B are block diagrams illustrating an HMD related to the present disclosure and a mobile terminal serving as a controller.

FIG. 2A is a block diagram illustrating the tethering-type HMD 100 related to the present disclosure.

Referring to FIG. 2A, the HMD 100 according to an embodiment of the present disclosure may include a wireless communication unit 110, a sensing unit 140, an output unit 150, an interface unit 160, a memory 170, a control unit 180, and a power supply unit 190. It is understood that implementing all of the illustrated components illustrated in FIG. 2A is not a requirement and that the HMD 100 may include greater or fewer components.

In detail, among the components, the wireless communication unit 110 may include one or more modules allowing for wireless communication between the mobile terminal 200 serving as a controller and the HMD 100 or between the HMD 100 and an external server. Also, the wireless communication unit 110 may include one or more modules connecting the HMD 100 to one or more networks.

Meanwhile, the sensing unit 140 may include one or more sensors for sensing a state in which the user wears the HMD 100. For example, the sensing unit 240 may include at least one sensor, such as a proximity sensor 141, an infrared sensor, or an optical sensor. Here, the infrared sensor or the optical sensor may be utilized as an eye tracking sensor for sensing where the user's eyes are focused by tracking the pupils of the user's eyes. For example, the eye tracking sensor may sense whether the pupils of the user's eyes can be tracked, and the controller 180 of the HMD 100 may control ON or OFF of an eye tracking function according to a sensing result from the eye tracking sensor.

The output unit 150 is typically configured to output various-types of information, such as audio, video, tactile output, and the like. The output unit 150 may include at least one of a display unit 151, an audio output unit 152, and a haptic module 153. The display unit 151 may be installed in a position corresponding to user's both eyes when the user wears the HMD 100 such that a large image may be provided to the user. Also, the audio output unit 152 may be provided in the form of a headphone that can be tightly attached to the user's both ears when the user wears the HMD 100. Also, the haptic module 153 may generate vibration related to currently reproduced content so that the user may receive tactile feedback that helps provides a more realistic experience to the user when viewing content through he HMD 100.

Meanwhile, the interface unit 160 serves as an interface for various-types of external devices that can be coupled to the HMD 100. The interface unit 160 may include at least one of various ports such as a wired/wireless headset port, an external charger port, or a wired/wireless data port. For example, when the HMD 100 and the mobile terminal 200 are connected wiredly, the interface unit 160 may serves as a passage in which various-types of data and information are exchanged between the HMD 100 and the mobile terminal 200.

The memory 170 stores a plurality of application programs (or applications) driven in the HMD 100 or data supporting various functions of the HMD 100. The memory 170 may store data and commands for operations of the HMD 100. At least some of the application programs may be downloaded from an external server through wireless communication. Also, at least some of the application programs may be provided in the HMD 100 at the time when the HMD 100 was released for basic functions (for example, reproducing (or playing) of content and outputting an image signal and an audio signal of played content). Meanwhile, the application programs may be stored in the memory 170 and may be installed in the HMD 100 and driven to perform an operation (or function) of the HMD 100 by the controller 180.

The controller 180 of the HMD 100 controls a general operation of the HMD 100 in addition to an operation related to the application program. The controller 180 may provide or process appropriate information or function to the user by processing a signal, data, or information input or output through the aforementioned components or driving the application programs stored in the memory 170.

Also, in order to drive the application programs stored in the memory, the controller 180 may control at least some of the other components of HMD 100 described above with reference to FIG. 2A. In addition, in order to drive the application programs, the controller 180 may coordinate the operation of two or more of the components included in the HMD 100 and operate the same.

The power supply unit 190 receives external power or internal power and supply power to the components included in the HMD 100 under the control of the controller 180. The power supply unit 190 may include a battery, and the battery may be an internal battery or a replaceable battery.

Figure 2B:
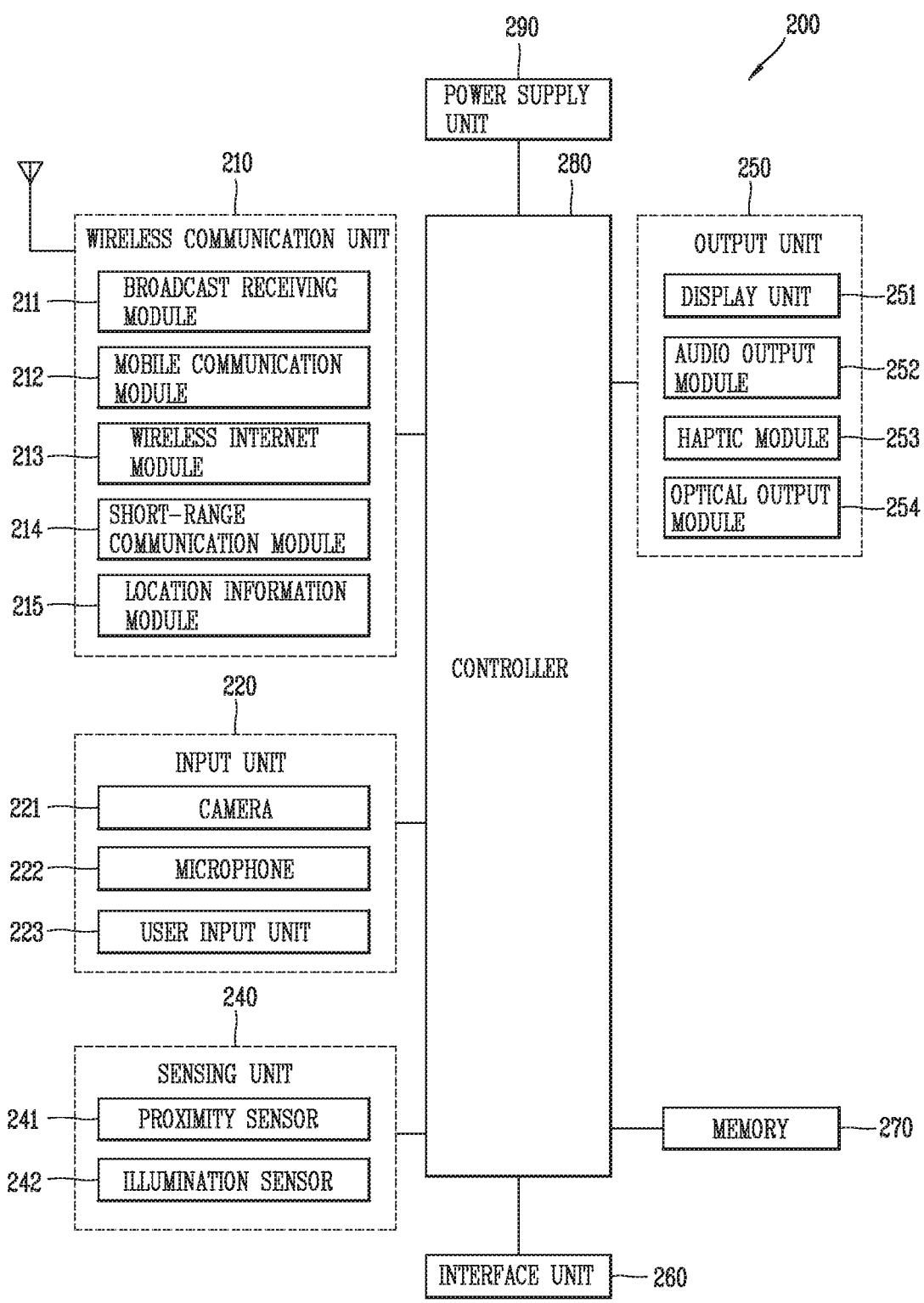

FIG. 2B is a block diagram illustrating the mobile terminal 200 that can be used as a controller device of the HMD 100 related to the present disclosure.

The mobile terminal 200 is shown having components such as a wireless communication unit 210, an input unit 220, a sensing unit 240, an output unit 250, an interface unit 260, a memory 270, a control unit 280, and a power supply unit 290. It is understood that implementing all of the illustrated components is not a requirement, and that greater or fewer components may alternatively be implemented.

The wireless communication unit 210 typically includes one or more modules which permit communications such as wireless communications between the mobile terminal 200 and a wireless communication system, communications between the mobile terminal 200 and another mobile terminal, communications between the mobile terminal 200 and an external server.

Further, the wireless communication unit 210 typically includes one or more modules which connect the mobile terminal 200 to one or more networks. To facilitate such communications, the wireless communication unit 210 includes one or more of a broadcast receiving module 211, a mobile communication module 212, a wireless Internet module 213, a short-range communication module 214, and a location information module 215.

The input unit 220 includes a camera 221 for obtaining images or video, a microphone 222, which is one-type of audio input device for inputting an audio signal, and a user input unit 223 (for example, a touch key, a push key, a mechanical key, a soft key, and the like) for allowing a user to input information. Data (for example, text, audio, video, image, and the like) is obtained by the input unit 220 and may be analyzed and processed by control unit 280 according to device parameters, user commands, and combinations thereof.

The sensing unit 240 is typically implemented using one or more sensors configured to sense internal information of the mobile terminal, the surrounding environment of the mobile terminal, user information, and the like. For example, in FIG. 2B, the sensing unit 240 is shown having a proximity sensor 241 and an illumination sensor 242. If desired, the sensing unit 240 may alternatively or additionally include other-types of sensors or devices, such as a touch sensor, an acceleration sensor, a magnetic sensor, a G-sensor or accelerometer, a gyroscope sensor, a motion sensor, an RGB (red-green-blue visible light spectrum) sensor, an infrared (IR) sensor, a finger scan sensor, a ultrasonic sensor, an optical sensor (for example, camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 200 may be configured to utilize information obtained from sensing unit 240, and in particular, information obtained from one or more sensors of the sensing unit 240, and combinations thereof.

The output unit 250 is typically configured to output various-types of information, such as audio, video, tactile output, and the like. The output unit 250 is shown having a display unit 251, an audio output module 252, a haptic module 253, and an optical output module 254.

The display unit 251 may have an inter-layered structure or an integrated structure with a touch sensor in order to facilitate a touch screen. The touch screen may provide an output interface between the mobile terminal 200 and a user, as well as function as the user input unit 223 which provides an input interface between the mobile terminal 200 and the user.

The interface unit 260 serves as an interface with various-types of external devices that can be coupled to the mobile terminal 200. The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 200 may perform assorted control functions associated with a connected external device, in response to the external device being connected to the interface unit 260.

The memory 270 is typically implemented to store data to support various functions or features of the mobile terminal 200. For instance, the memory 270 may be configured to store application programs executed in the mobile terminal 200, data or instructions for operations of the mobile terminal 200, and the like. Some of these application programs may be downloaded from an external server via wireless communication. Other application programs may be installed within the mobile terminal 200 at time of manufacturing or shipping, which is typically the case for basic functions of the mobile terminal 200 (for example, receiving a call, placing a call, receiving a message, sending a message, and the like). It is common for application programs to be stored in the memory 270, installed in the mobile terminal 200, and executed by the control unit 280 to perform an operation (or function) for the mobile terminal 200.

The control unit 280 typically functions to control overall operation of the mobile terminal 200, in addition to the operations associated with the application programs. The control unit 280 may provide or process information or functions appropriate for a user by processing signals, data, information and the like, which are input or output by the various components depicted in FIG. 2B, or activating application programs stored in the memory 270. As one example, the control unit 280 controls some or all of the components illustrated in FIG. 2B according to the execution of an application program that have been stored in the memory 270.

The power supply unit 290 can be configured to receive external power or provide internal power in order to supply appropriate power required for operating elements and components included in the mobile terminal 201. The power supply unit 290 may include a battery, and the battery may be configured to be embedded in the terminal body, or configured to be detachable from the terminal body.

At least some of the above components may operate in a cooperating manner, so as to implement an operation or a control method of a glass-type terminal according to various embodiments to be explained later. The operation or the control method of the glass-type terminal may be implemented on the glass-type terminal by driving at least one application program stored in the memory 270.

Referring still to FIG. 2B, various components depicted in this figure will now be described in more detail.

Regarding the wireless communication unit 210, the broadcast receiving module 211 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 211 may be utilized to facilitate simultaneously receiving of two or more broadcast channels, or to support switching among broadcast channels.

The mobile communication module 212 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 212 include audio call signals, video (telephony) call signals, or various formats of data to support communication of text and multimedia messages.

The wireless Internet module 213 is configured to facilitate wireless Internet access. This module may be internally or externally coupled to the mobile terminal 200. The wireless Internet module 213 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 213 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 213 performs such wireless Internet access. As such, the wireless Internet module 213 may cooperate with, or function as, the mobile communication module 212.

The short-range communication module 214 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 214 in general supports wireless communications between the mobile terminal 200 and a wireless communication system, communications between the mobile terminal 200 and another mobile terminal 200, or communications between the mobile terminal 200 and a network where another mobile terminal 200 (or an external server) is located, via wireless area networks. One example of the wireless area networks is a wireless personal area network.

In some embodiments, another mobile terminal 200 (which may be configured similarly to mobile terminal 200) may be a wearable device, for example, a smart watch, smart glasses or a head-mounted display (HMD) 100, which is able to exchange data with the mobile terminal 200 (or otherwise cooperate with the mobile terminal 200). The short-range communication module 214 may sense or recognize the wearable device, and permit communication between the wearable device and the mobile terminal 200. In addition, when the sensed wearable device is a device which is authenticated to communicate with the mobile terminal 200, the control unit 280, for example, may cause transmission of data processed in the mobile terminal 200 to the wearable device via the short-range communication module 214. Hence, a user of the wearable device may use the data processed in the mobile terminal 200 on the wearable device. For example, when a call is received in the mobile terminal 200, the user may answer the call using the wearable device. Also, when a message is received in the mobile terminal 200, the user can check the received message using the wearable device.

The location information module 215 is generally configured to detect, calculate, derive or otherwise identify a position of the mobile terminal 200. As an example, the location information module 215 includes a Global Position System (GPS) module, a Wi-Fi module, or both. If desired, the location information module 215 may alternatively or additionally function with any of the other modules of the wireless communication unit 210 to obtain data related to the position of the mobile terminal.

As one example, when the mobile terminal 200 uses a global positioning service (GPS) module, a position of the mobile terminal 200 may be acquired using a signal sent from a GPS satellite. As another example, when the mobile terminal 200 uses the Wi-Fi module, a position of the mobile terminal can be acquired based on information related to a wireless access point (AP) which transmits or receives a wireless signal to or from the Wi-Fi module.

The input unit 220 may be configured to permit various-types of input to the mobile terminal 220. Examples of such input include audio, image, video, data, and user input. Image and video input is often obtained using one or more cameras 221. Such cameras 221 may process image frames of still pictures or video obtained by image sensors in a video or image capture mode. The processed image frames can be displayed on the display unit 251 or stored in memory 270. In some cases, the cameras 221 may be arranged in a matrix configuration to permit a plurality of images having various angles or focal points to be input to the mobile terminal 201. As another example, the cameras 221 may be located in a stereoscopic arrangement to acquire left and right images for implementing a stereoscopic image.

The camera 221 typically includes at least one a camera sensor (CCD, CMOS etc.), a photo sensor (or image sensors), and a laser sensor.

Implementing the camera 221 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The microphone 222 is generally implemented to permit audio input to the mobile terminal 200. The audio input can be processed in various manners according to a function being executed in the mobile terminal 200. If desired, the microphone 222 may include assorted noise removing algorithms to remove unwanted noise generated in the course of receiving the external audio.

The user input unit 223 is a component that permits input by a user. Such user input may enable the control unit 280 to control operation of the mobile terminal 200. The user input unit 223 may include one or more of a mechanical input element (for example, a key, a button located on a front and/or rear surface or a side surface of the mobile terminal 200, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 240 is generally configured to sense one or more of internal information of the mobile terminal, surrounding environment information of the mobile terminal, user information, or the like. The control unit 280 generally cooperates with the sending unit 240 to control operation of the mobile terminal 200 or execute data processing, a function or an operation associated with an application program installed in the mobile terminal based on the sensing provided by the sensing unit 240. The sensing unit 240 may be implemented using any of a variety of sensors, some of which will now be described in more detail.

The proximity sensor 241 may include a sensor to sense presence or absence of an object approaching a surface, or an object located near a surface, by using an electromagnetic field, infrared rays, or the like without a mechanical contact. The proximity sensor 241 may be arranged at an inner region of the mobile terminal covered by the touch screen, or near the touch screen.

The proximity sensor 241, for example, may include any of a transmissive-type photoelectric sensor, a direct reflective-type photoelectric sensor, a mirror reflective-type photoelectric sensor, a high-frequency oscillation proximity sensor, a capacitance-type proximity sensor, a magnetic-type proximity sensor, an infrared rays proximity sensor, and the like. When the touch screen is implemented as a capacitance-type, the proximity sensor 241 can sense a proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 241 may sense proximity touch, and proximity touch patterns (for example, distance, direction, speed, time, position, moving status, and the like). In general, control unit 280 processes data corresponding to proximity touches and proximity touch patterns sensed by the proximity sensor 241, and cause output of visual information on the touch screen. In addition, the control unit 280 can control the mobile terminal 200 to execute different operations or process different data according to whether a touch with respect to a point on the touch screen is either a proximity touch or a contact touch.

A touch sensor can sense a touch applied to the touch screen, such as display unit 251, using any of a variety of touch methods. Examples of such touch methods include a resistive-type, a capacitive-type, an infrared-type, and a magnetic field-type, among others.

As one example, the touch sensor may be configured to convert changes of pressure applied to a specific part of the display unit 251, or convert capacitance occurring at a specific part of the display unit 251, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 280. Accordingly, the control unit 280 may sense which region of the display unit 251 has been touched. Here, the touch controller may be a component separate from the control unit 280, the control unit 280, and combinations thereof.

In some embodiments, the control unit 280 may execute the same or different controls according to a-type of touch object that touches the touch screen or a touch key provided in addition to the touch screen. Whether to execute the same or different control according to the object which provides a touch input may be decided based on a current operating state of the mobile terminal 200 or a currently executed application program, for example.

The touch sensor and the proximity sensor 241 may be implemented individually, or in combination, to sense various-types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 280, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The display unit 251 is generally configured to output information processed in the mobile terminal 200. For example, the display unit 251 may display execution screen information of an application program executing at the mobile terminal 200 or user interface (UI) and graphic user interface (GUI) information in response to the execution screen information.

In some embodiments, the display unit 251 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 252 is generally configured to output audio data. Such audio data may be obtained from any of a number of different sources, such that the audio data may be received from the wireless communication unit 210 or may have been stored in the memory 270. The audio data may be output during modes such as a signal reception mode, a call mode, a record mode, a voice recognition mode, a broadcast reception mode, and the like. The audio output module 252 can provide audible output related to a particular function (e.g., a call signal reception sound, a message reception sound, etc.) performed by the mobile terminal 200. The audio output module 252 may also be implemented as a receiver, a speaker, a buzzer, or the like.

A haptic module 253 can be configured to generate various tactile effects that a user feels, perceive, or otherwise experience. A typical example of a tactile effect generated by the haptic module 253 is vibration. The strength, pattern and the like of the vibration generated by the haptic module 253 can be controlled by user selection or setting by the control unit 280. For example, the haptic module 253 may output different vibrations in a combining manner or a sequential manner.

Besides vibration, the haptic module 253 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 253 can also be implemented to allow the user to feel a tactile effect through a muscle sensation such as the user's fingers or arm, as well as transferring the tactile effect through direct contact. Two or more haptic modules 253 may be provided according to the particular configuration of the mobile terminal 200.

An optical output module 254 can output a signal for indicating an event generation using light of a light source. Examples of events generated in the mobile terminal 200 may include message reception, call signal reception, a missed call, an alarm, a schedule notice, an email reception, information reception through an application, and the like.

A signal output by the optical output module 254 may be implemented in such a manner that the mobile terminal emits monochromatic light or light with a plurality of colors. The signal output may be terminated as the mobile terminal senses that a user has checked the generated event, for example.

The interface unit 260 serves as an interface for external devices to be connected with the mobile terminal 200. For example, the interface unit 260 can receive data transmitted from an external device, receive power to transfer to elements and components within the mobile terminal 200, or transmit internal data of the mobile terminal 200 to such external device. The interface unit 260 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 200 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 200 via the interface unit 260.

When the mobile terminal 200 is connected with an external cradle, the interface unit 260 can serve as a passage to allow power from the cradle to be supplied to the mobile terminal 200 or may serve as a passage to allow various command signals input by the user from the cradle to be transferred to the mobile terminal there through. Various command signals or power input from the cradle may operate as signals for recognizing that the mobile terminal 200 is properly mounted on the cradle.

The memory 270 can store programs to support operations of the control unit 280 and store input/output data (for example, phonebook, messages, still images, videos, etc.). The memory 270 may store data related to various patterns of vibrations and audio which are output in response to touch inputs on the touch screen.

Meanwhile, the controller 280 of the mobile terminal 200 may inform the HMD 100 about occurrence of various events detected in the mobile terminal 200. For example, when an occurrence of an event is detected in the mobile terminal 200, the controller 180 of the HMD 100 may display notification information corresponding to the event that occurs in the mobile terminal 200 on the display unit 151 of the HMD 100. Thus, the user may check the event that occurs in the mobile terminal 200 even while viewing content through the HMD 100.

Meanwhile, in a case in which the user checks occurrence of an event that occurs in the mobile terminal 200 and takes off the HMD 100, the controller 180 of the HMD 100 may detect a changed worn-on state (or put-on state) of the HMD 100. The controller 180 of the HMD 100 may determine that the user has taken off the HMD 100 in order to check the event that currently occurs in the mobile terminal 200, and thus, the controller 180 of the HMD 100 may control the mobile terminal 200 to operate in a specific operational state (or mode). For example, when the user takes off the HMD 100 in a state in which notification information of a specific event is displayed, the controller 180 of the HMD 100 may control the mobile terminal 200 to enter an operational state related to the specific event. Thus, in certain examples, when the user takes off the HMD 100 to check information related to the specific event, a screen related to the specific event may be displayed on the mobile terminal 200 during a particular time period.

In addition, when the HMD 100 according to an embodiment of the present disclosure is taken off, the controller 180 of the HMD 100 may perform different functions regarding content currently played according to the take-off state of the HMD 100. For example, the controller 180 of the HMD 100 determines whether the user has completely taken off the HMD 100 or whether the user has temporarily taken off (that is, the user has partially taken off the HMD 100) according to the sensing result from the sensing unit 140, and may perform different functions according to the determination result. In one example, the user may "completely" take off the HMD 100 when HMD 100 is removed from the user's head for at least a threshold time period, and the user may "temporarily" take off the HMD 100 when HMD 100 is removed from the user's head for less than the threshold time period. In another example, the user may "completely" take off the HMD 100 when HMD 100 is removed from the user's head, and the user may "temporarily" take off the HMD 100 when HMD 100 is still on the user's head but the HMD 100 is not positioned before the user's eyes (e.g., moves the HMD 100 sideways, up, or down on the user's face) or when the user moves the HMD 100 (e.g., pulls it forward relative to the user's head) to enable the user to detect ambient light, sound, or other conditions. In this second example, the user may be "temporarily" take off the HMD 100 when sensors in HMD 100 detect the proximity of the user's head to the HMD 100, but the HMD 100 cannot present images to the user's eyes (e.g., when the user's eyes are not correctly positioned to receive light energy produced by display unit 151.

That is, in a situation in which the user has temporarily taken off the HMD 100, the controller 180 of the HMD 100 may maintain a pause state rather than terminating a currently executed function. For instance, when the user temporarily takes off the HMD 100, the controller 180 of the HMD 100 may maintain the currently played (or reproduced) content in a pause state, and when the user puts on the HMD 100 again, the controller 180 of the HMD 100 may resume playing of the content from the pause state.

On the other hand, in a case in which the user has completely taken off the HMD 100, the controller 180 of the HMD 100 may generate bookmark information related to the currently executed function. For example, the bookmark information may be information related to the currently executed function and information related to an operational state of the HMD 100 at the time when the HMD 100 is completely taken off. For example, when the currently executed function relates to playing specific content, the bookmark information may include information regarding the currently played content and information regarding a time at which the HMD 100 is completely taken off. In this example in which the user has completely taken off the HMD 100 while the HMD 100 is playing content, HMD 100 may stop playing the content based on the user taking off the HMD 100, and HMD 100 may generate and store bookmark information regarding (1) a time at which playback of the content was stopped and/or (2) a portion of the content being presented when the playback of the content was stopped.

When the bookmark information is generated and stored (e.g., based on the user completely taking off the HMD 100) and the user subsequently puts the HMD 100 back on, the controller 180 of the HMD 100 may allow the user to select, based on the stored bookmark information, to continue to play the previously played content from the stopped position, to replay the previously played content from the start, or to play new content. The controller 180 of the HMD 100 may then control each of the components of the HMD 100 to play old or new content according to a user selection.

Hereinafter, embodiments related to a control method that may be implemented in the HMD 100 configured as described above will be described with reference to the accompanying drawings. It will be apparent to those skilled in the art that modifications and variations can be made without departing from the spirit and scope of the invention.

Figure 3:
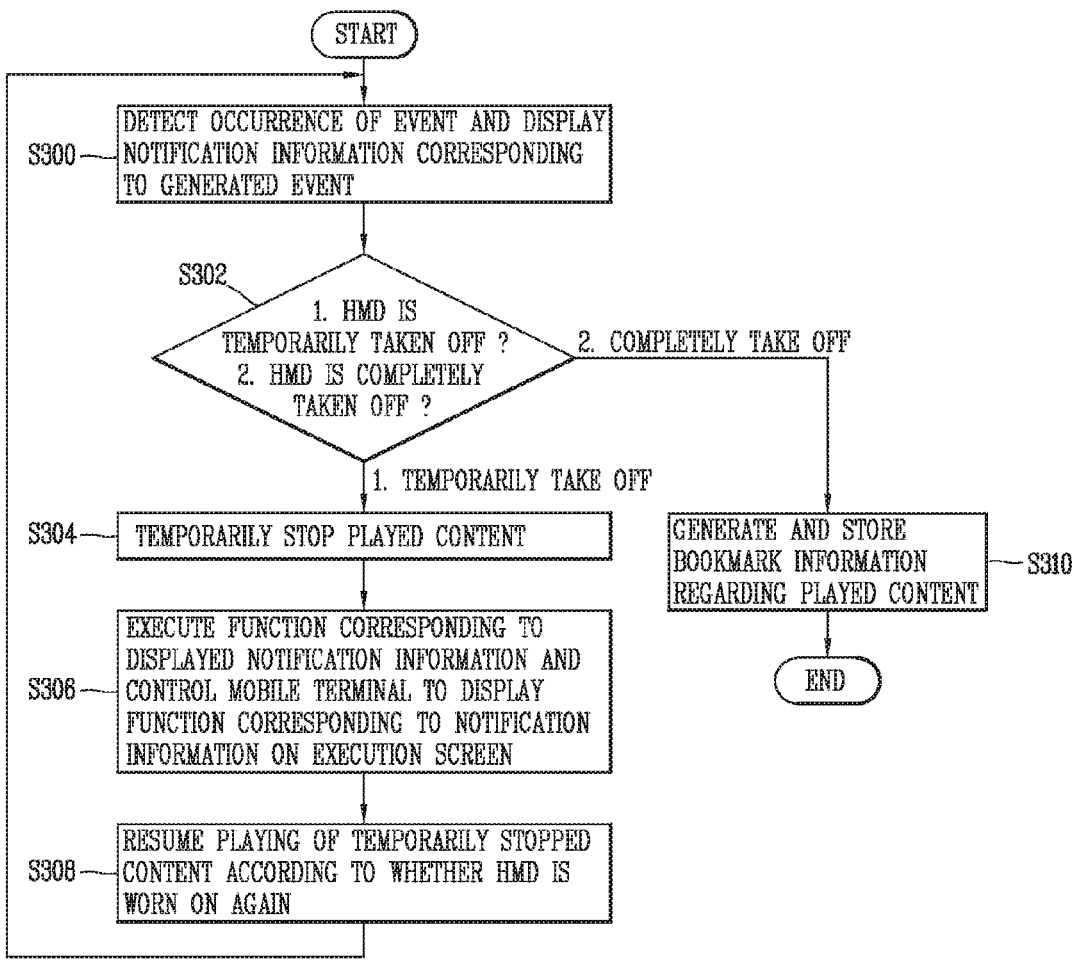
FIG. 3 is a flow chart illustrating an operational process of an HMD related to the present disclosure.

FIG. 3 is a flow chart illustrating an operational process of an HMD 100 according to certain embodiments. In the following descriptions, example in which a mobile terminal 200 serves as a controller for the HMD 100 will be described. However, the present disclosure is not limited to only situations in which the HMD 100 is controlled by a mobile terminal 200. That is, any other device, other than the mobile terminal 200, may also be used as a controller. In this example, the HMD 100 may display various-types of notification information related to an event that occurs in the controller device (e.g., in mobile terminal 200), on the display unit 151 of the HMD 100.

Referring to FIG. 3, when specific content is selected by the user, the controller 180 of the HMD 100 may output an image signal and an audio signal related to the selected content. In this state, the HMD 100 may detect an event that occurs in the mobile terminal 200 connected to the HMD 100, and when an event occurs, notification information corresponding to the generated event may be displayed on the display unit 151 (S300).

When the notification information related to the specific event is displayed, the controller 180 may sense how the user is wearing the HMD 100. For instance, the controller 180 may determine how the HMD 100 being worn during a first time period when the notification information is displayed, during a second time period before the notification information is displayed, and/or during a third time period after the notification information is displayed. For example, the controller 180 of the HMD 100 may sense whether a manner in which the HMD 100 is worn has been changed using sensors provided in the sensing unit 140. When a manner in which the HMD 100 is worn has changed, the controller 180 may control and/or modify an operational state of the HMD 100 according to the changes in how the HMD 100 is worn.

For example, the controller 180 may sense a currently worn-on state of the HMD 100 by using the proximity sensor 141, the tracking sensor 142, and/or other sensors provided in the sensing unit 140. In this case, on the basis of the sensing result of the proximity sensor 141 and the sensing result of the tracking sensor 142, the controller 180 may determine when the HMD 100 is temporarily taken off, or the HMD 100 is completely taken off (S302).

Here, a state in which the HMD 100 is "temporarily taken off" may include a state in which the HMD 100 is positioned adjacent to the user's head part but the user does not look at the screen of the display unit 151. That is, "temporarily taken off" may refer to a state in which the user does not completely take off the HMD 100 and, instead, slightly lifts the HMD 100 so that the user's eyes are not covered by the HMD 100. In another example, when the HMD 100 is adjacent to and/or in contact with the user's head and the user is not looking at the screen of the display unit 151 of the HMD 100, the controller 180 may determine that the user has temporarily taken off the HMD 100 and may perform a corresponding operation.

When the controller 180 determines that the HMD 100 has been completely taken off (e.g., no longer positioned adjacent to and/or in contact with the user's head) according to the determination result of step S302, the controller 180 may terminate all the functions that are currently being performed or otherwise driven in the HMD 100, such as presenting audio and/or video content to the user. This terminating of the functions helps to minimize a waste of power by the HMD 100 when the user completely takes off the HMD 100 and, therefore, cannot benefit from the continued performance of the functions.

As shown in FIG. 3, before the functions being driven in the HMD 100 are terminated, bookmark information related to a function currently being driven in the HMD 100 may be generated and stored (S310). Here, the bookmark information may be information related to a currently executed function and a state in which the function is being executed at point in time at which the HMD 100 is completely taken off (e.g., just prior to the function being terminated). For instance, when a currently executed function relates to playing back content, the bookmark information may include information regarding the played content and information regarding a point in time at which the HMD 100 is completely taken off, such as information regarding a time duration during which the content is played prior to the HMD 100 being taken off. In another example, if the function relates to providing a game, the bookmark information may identify a portion of the game being played by the user when the HMD 100 is completely removed. In other instances, the bookmark information may identify tasks completed by the function in a time period prior to the HMD 100 being completely removed and/or pending tasks, such as incomplete tasks and tasks being queued to be performed by the function.

When the controller 180 determines that the HMD 100 is temporarily taken off according to a determination result of step S302, the controller 180 may pause a function being performed by HMD 100, such as temporarily stopping the playing of the content (S304). Thus, when the HMD 100 is temporarily taken off in step S302 while HMD 100 is displaying notification information regarding a specific event in mobile terminal 200 or during a threshold time period after the notification time period is displayed (e.g., within 5 seconds), the controller 180 may determine that the user has temporarily taken off the HMD 100 in order to perform a function related to the specific event, such as to view a notification, to perform a related action, generate a message, etc.

When controller 180 determines that the HMD 100 is temporarily taken off in step S302 while the HMD 100 is displaying notification information regarding a specific event in mobile terminal 200, the controller 180 may switch the HMD 100 to a pause state, instead of terminating the function currently performed in the HMD 100 (for example, the pause content being presented by a content play function), and thus, when the user wears the HMD 100 again, the function performed in the HMD 100 may be executed from the paused position (e.g., to continue to present the displayed content from a paused point). Accordingly, in this example, when the HMD 100 is temporarily taken off, the content which has been played in the HMD 100 may be temporarily stopped (or paused), and when the user wears the HMD 100 again, the HMD 100 may restart the playback of the stopped content from the paused positioned (e.g., without restarting the playback of the content). Thus, in the present disclosure, even when content playback is paused when the user takes off the HMD 100 to take a break, check an event, or the like, the user may continue to view the content from a paused positioned when the HMD 100 is re-worn.

Meanwhile, when the HMD 100 is taken off, the controller 180 of the HMD 100 according to an embodiment of the present disclosure may forward a message or otherwise control the mobile terminal 200 (or other control device) currently connected to the HMD 100 to switch the mobile terminal 200 into a state in which a function related to the specific event is performed by the mobile terminal 200 (S306).

For example, when the notification information related to the specific event is displayed on the display unit 151, as described above, and the user temporarily takes off the HMD 100, the controller 180 may transmit a control signal for executing the function corresponding to the specific event to the mobile terminal 200. In one example, when the user takes off the HMD 100, a screen related to the function corresponding to the specific event may be immediately displayed on the mobile terminal 200 connected to the HMD 100, whereby the user would not need to select the specific function or otherwise provide an input in the mobile terminal 200 to check information of the specific event or use the related function. An example in which the mobile terminal 200 enters a specific operational state according to a change in a worn-on state of the HMD 100 will be described in detail with reference to FIG. 7.

Meanwhile, after the control signal is transmitted to the mobile terminal 200 in step S306, the controller 180 may detect whether the user wears the HMD 100 again. According to whether the user wears the HMD 100 again, the controller 180 may resume playing of the temporarily stopped content (S308).

As previously described, when the user temporarily takes off the HMD 100, the control signal for executing the function corresponding to the specific event may be transmitted to the mobile terminal 200, but a similar control signal may also be sent from the HMD 100 to the mobile terminal 200 when the HMD 100 is completely taken off. That is, when it is determined that the HMD 100 is completely taken off according to the detection result of step S302, the controller 180 may also transmit a control signal for executing the function corresponding to the specific event to the mobile terminal 200. Also, the controller 180 may generate and store bookmark information related to the currently executed function of the HMD 100 in step S310 and may terminate the function of the HMD 100.

Figure 4:
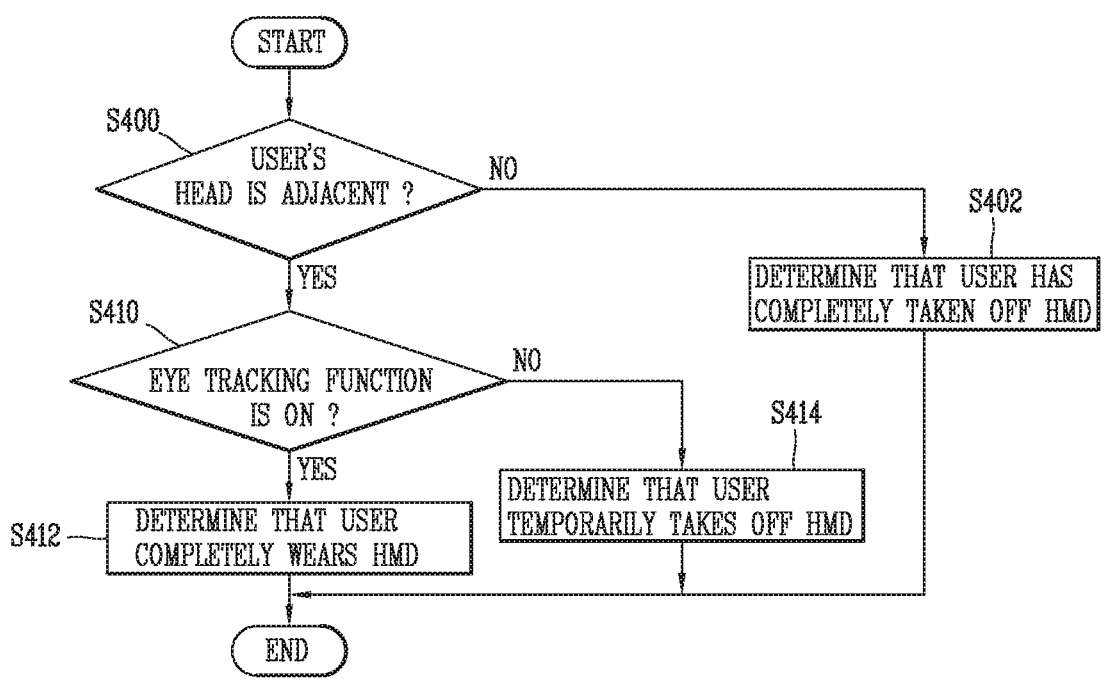
FIG. 4 is a flow chart illustrating an operational process of determining a state in which a user is currently wearing an HMD related to the present disclosure.

FIG. 4 is a flow chart illustrating an operation process of determining whether the user is wearing the HMD 100 or has temporarily or completely taken off the HMD 100.

When a worn HMD 100 is taken off by a user, the controller 180 may detect, according to an embodiment of the present disclosure, whether the user completely takes off the HMD 100 or whether the user temporarily takes off the HMD 100 by using detection results of the proximity sensor 141 and the eye tracking sensor 142 included in the sensing unit 140. FIG. 4 is a flow chart illustrating a process in which the controller 180 uses proximity sensor 141 and the eye tracking sensor 142 to determine whether the user completely or temporarily takes off the HMD 100.

Referring to FIG. 4, the controller 180 of the HMD 100 according to an embodiment of the present disclosure may determine whether a user's head part is detected by using the proximity sensor 141 (S400). For example, controller 180 may determine whether the HMD 100 is in contact with a user's head or other body part. When the proximity sensor 141 fails to detect the user's head part according to the check result of step S400, the controller 180 may determine that the HMD 100 is currently spaced apart from the user's head part by a predetermined distance or longer, and thus, the HMD 100 is completely taken off (S402). For example, proximity sensor 141 may emit an electromagnetic field or a beam of electromagnetic radiation, and proximity sensor 141 may determine whether the HMD 100 is in contact with a user's head or other body part based on changes in the field or a return signal (e.g., when the beam of electromagnetic radiation is reflected by the user's head).

Meanwhile, when the adjacent user's head part is sensed according to the detection result of the proximity sensor 141 (S400—Yes), the controller 180 may determine whether an eye tracking function is in an ON state (S410). Here, the eye tracking function may be turned on when the eye tracking sensor 142 can track the pupil of the user's eyes. That is, according to a state in which the eye tracking function is turned on, that according to whether a direction of the user's eyes is detected, the controller 180 may determine whether the user is currently views the display unit 151 of the HMD 100. For example, the eye tracking sensor 142 may transmit electromagnetic radiation and may detected a reflection of the electromagnetic radiation by the cornea, the retina, or another portion of the user's eyes. In another example, eye tracking sensor 142 may detect a reflection, by the user's eyes, of visible light or other electromagnetic radiation generated by another component of HMD 100, such as display unit 151. The eye tracking sensor 142 may determine whether the user is viewing the display unit 151 based on the detected reflection. In the current discussion, the eye tracking function may be considered to be "activated" when, for instance, the eye tracking sensor 142 detects a reflection from the user's eyes.

Thus, in a state in which the user's head part determined to be adjacent to HMD 100 according to the detection result of the proximity sensor 141 and the eye tracking function is turned on (e.g., the user is viewing display unit 151), the controller 180 may determine that the user is currently completely wearing the HMD 100 (S412). However, in a case in which the user's head part is currently adjacent according to the detection result of the proximity sensor 141 but the eye tracking function is not turned on according to the detection result of step S410 (i.e., the eye tracking function is in an OFF state or otherwise cannot detect the user's eyes), the controller 180 may determine that the user is not currently looking at the display unit 151 of the HMD 100 and that the user has temporarily taken off the HMD 100 (S414). For example, the controller 180 may determine that the user has temporarily taken off the HMD 100 when the HMD 100 is on the user's head but not correctly positioned (e.g., too high or low or on a side of the user's face) for eye tracking sensor 142 to detect the user's eyes.

Meanwhile, according to the above descriptions, FIG. 3 discloses that when a specific event occurs, corresponding notification information is displayed, and when the user changes a worn-on state of the HMD 100, the mobile terminal 200 enters an operational state corresponding to the specific event. Here, however, a plurality of events may occur sequentially or simultaneously in the mobile terminal 200. In this case, the controller 180 of the HMD 100 may display notification information corresponding to each of the plurality of events on the display unit 151.

Meanwhile, when a particular period of time has passed after the notification information is initially displayed, the HMD 100 may terminate the display of the notification information. Thus, when the user does not want to check the event corresponding to the displayed notification information, the user may view content without the content playback being interfered by the notification information. Thus, when the user wears the HMD 100 for a long period of time, the number of unchecked events may continue to increase.

When the user temporarily or completely takes off the HMD 100 after a time (e.g., during the playback of content) during which a plurality of events are not checked, the controller 180 may control the mobile terminal 200 to display information regarding the plurality of unchecked events. For example, the controller 180 may control the mobile terminal 200 to display a list of the unchecked events such that the user may provide an input to select or otherwise request information regarding any one of the unchecked events.

Figure 5:
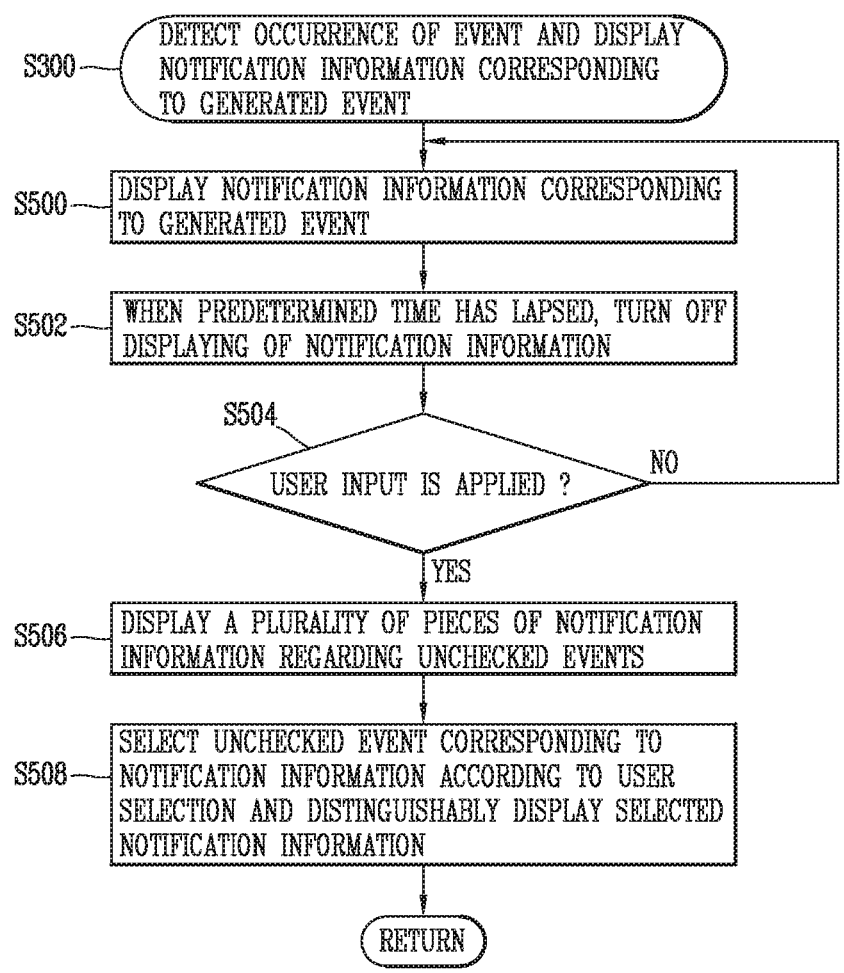
FIG. 5 is a flow chart illustrating an operational process of displaying a plurality of pieces of notification information and selecting any one of the plurality pieces of notification information in an HMD related to the present disclosure.

Additionally or alternatively, when multiple unchecked events have accumulated, the controller 180 may display information regarding the unchecked events on the display unit 151 of the HMD 100 according to a user selection and the user may provide an input to select otherwise request information regarding any one of the unchecked events. In a case in which a worn-on state of the HMD 100 is changed (e.g., the user temporarily or completely removes the HMD 100), the mobile terminal 200 may be controlled to enter an operational state corresponding to one of the unchecked events according to a user selection of that unchecked event. FIG. 5 is a flow chart illustrating an operational process in which the HMD 100 displays notification information regarding multiple events and the user selects any one of the plurality of pieces of notification information.

Referring to FIG. 5, the controller 180 of the HMD 100 according to an embodiment may display, on display unit 151, notification information corresponding to an event that occurs in the mobile terminal 200 (S500). When a change in a worn-on state of the HMD 100 (e.g., when the HMD 100 is temporarily or completely removed) is detected before a predetermined period of time has passed after the notification information is initially displayed, the controller 180 may perform an operation corresponding to the change in the worn state. That is, when the user temporarily or completely takes off the HMD 100 while display unit presents 151 notification information regarding an occurrence of a specific event, the controller 180 may cause the mobile terminal 200 to enter a specific operational state related to the event, such as steps S304 to S310 of FIG. 3.

Meanwhile, when the notification information indicating the occurrence of the event is displayed for a particular period of time (e.g., for 10 seconds), the controller 180 may cause display unit 151 to stop displaying of the notification information (S502). In this case, even though the user does not check the notification information (e.g., does not take off the HMD 100), the notification information may not be displayed any longer beyond the particular time period. Thus, in a case in which the user does not take off the HMD 100, unchecked events, which have not been reviewed by the user, may continue to be accumulated.

When HMD 100 has accumulated unchecked events, the controller 180 may detect whether there is a user input (S504) associated with one of the unchecked events. For example, the user input may be a particular touch input applied to the mobile terminal 200 serving as a controller or an input of a specific key. In another example, the user input may be received by interface unit of HMD 100. The input may relate to a request to receive additional information regarding one or more of the events.

When a user input is detected in step S504, the controller 180 may display notification information regarding the unchecked events on the display unit 151 (S506). For example, the display unit 151 may present, as the notification information, a list identifying the unchecked events, and one of the pieces of notification information may be selected according to another input by the user. In this case, the controller 180 may display the notification information corresponding to the selected unchecked event according to the user selection to be differentiated from the other pieces of notification information (S508). The user may visually identify information regarding the selected unchecked event. For example, information regarding the selected event may be displayed brighter, larger, differently positioned, in a different font, in a more conspicuous location, highlighted, etc. in comparison to information associated with other, non-selected events.

The user input signal may correspond to a user's touch input applied to the mobile terminal 200. That is, according to a touch input sensed from the touch screen of the mobile terminal 200, the controller 180 of HMD 100 may select any one of the unchecked events. When a change in a worn-on state of the HMD 100 is detected (i.e., when the HMD 100 is temporarily or completely taken off) during a threshold time period after a specific unchecked event is selected and/or information regarding the selected event is being presented on the HMD 100, the controller 180 may control the mobile terminal 200 to enter an operational state corresponding to the selected unchecked event. For example, if a selected event relates to a message received by the mobile terminal 200, controller 180 may cause, when the user removes HMD 100 during a threshold time period after selecting the event, the mobile terminal 200 to present a screen related to an application for accessing the message. An example in which information regarding a plurality of unchecked events is displayed on the display unit 151 and a screen related to a selected one of the displayed unchecked events is displayed on the display unit 251 of the mobile terminal 200 will be described in detail with reference to FIGS. 8A and 8B.

Figure 6:
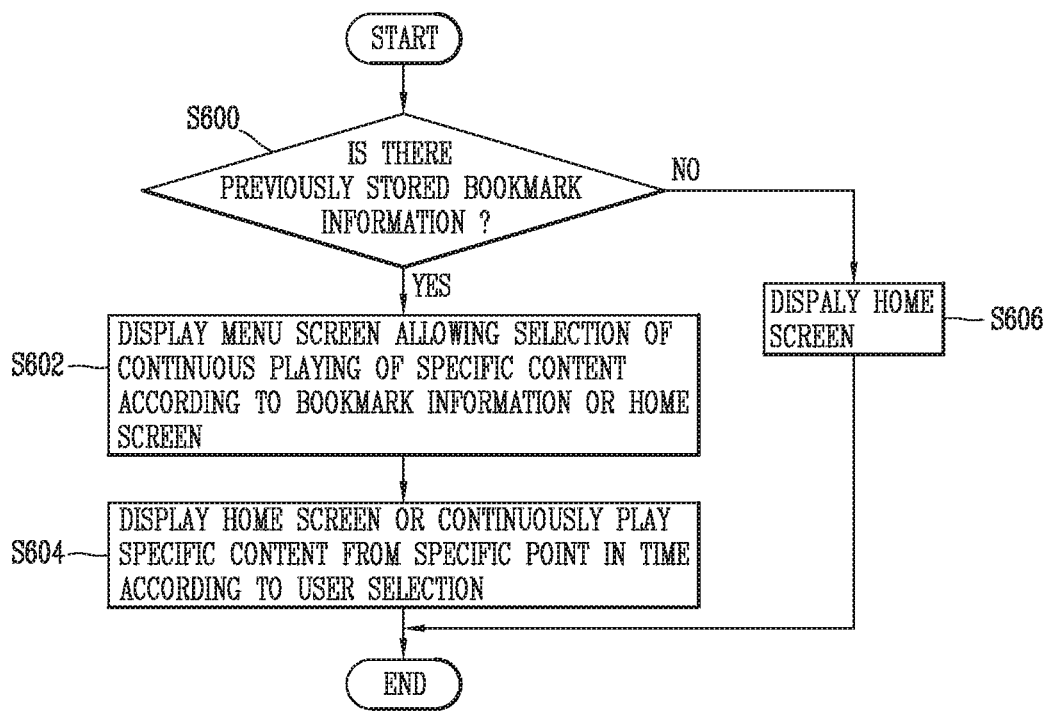
FIG. 6 is a flow chart illustrating an operational process of selecting continuous playing of content or displaying of a home screen when a user wears an HMD related to the present disclosure.

Meanwhile, as described above, when the notification information related to a specific event is displayed or selected and the HMD 100 is completely taken off, bookmark information related to a function currently executed in the HMD 100 may be generated and stored. Accordingly, in the present disclosure, when the user completely takes off the HMD 100 and then subsequently wears it again, the user may submit an input or otherwise direct HMD 100 to either continue performing a function being executed when the HMD 100 is completely taken off or to execute a new function. For example, when the function relates to playing back digital content, the user may select whether HMD 100 should to continue to playback the content being viewed before the HMD 100 was completely taken off or, alternatively, to present a screen to enable the user to select new content is to be displayed. FIG. 6 is a flow chart illustrating an operational process of selecting, when the user puts on the HMD 100, whether to continuous to play content being presented when the user removed HMD 100 or to display a home screen for the user to select new content.

Referring to FIG. 6, when the user wears the HMD 100 after the HMD 100 was completely taken off, the controller 180 of the HMD 100 according to an embodiment may check whether there is previously stored bookmark information (S600). For example, after the HMD 100 is completely taken off, the controller 180 may determine that the user is again wearing the HMD 100 when the sensing unit 140 subsequently senses that the HMD 100 is adjacent to the user's head and that the eye tracking function (e.g., performed by eye tracking sensor 142) is turned on. In other words, the controller 180 may determine that the user is again wearing the HMD 100 based on determining that the HMD 100 is on the user's head and is positioned such that the user can view display unit 151. After determining that the HMD 100 is being worn, controller 180 may determine whether HMD 100 stores bookmark information regarding a prior function being performed when the HMD 100 was completely removed.

Meanwhile, when there is no previously stored bookmark information according to the determination result of step S600, the controller 180 may directly display a home screen allowing the user to select new content on the display unit 151.

However, when there is previously stored bookmark information according to the determination result of step S600, the controller 180 may display a menu screen for selecting continuous playing of specific content according to the bookmark information or displaying a home screen on the display unit 151 (S602). The controller 180 may display a home screen or play specific content according to the bookmark information from a specific point in time designated by the bookmark information (S604). Accordingly, in the present disclosure, even in a case in which the user completely takes off the HMD 100 and then wears it again, the use may selectively view new content or may continue to view content that the user viewed before having taken off the HMD 100. An example in which, when the user puts on the HMD 100, the user selects continuous playing content according to previously stored bookmark information or a screen (home screen) for selecting new content will be described with reference to FIG. 10.

Meanwhile, in the above, the operational process in which the HMD 100 according to an embodiment of the present disclosure operates differently according to a worn-on state of the HMD 100 over an event that occurs in the mobile terminal 200 serving as a controller has been described in detail with reference to a plurality of flow charts.

Hereinafter, examples in which the HMD 100, according to an embodiment, displays notification information regarding an event that occurs in the mobile terminal 200 and selectively controls the mobile terminal 200 according to a worn-on state of the HMD 100 will be described with reference to the accompanying drawings.

Figure 7:
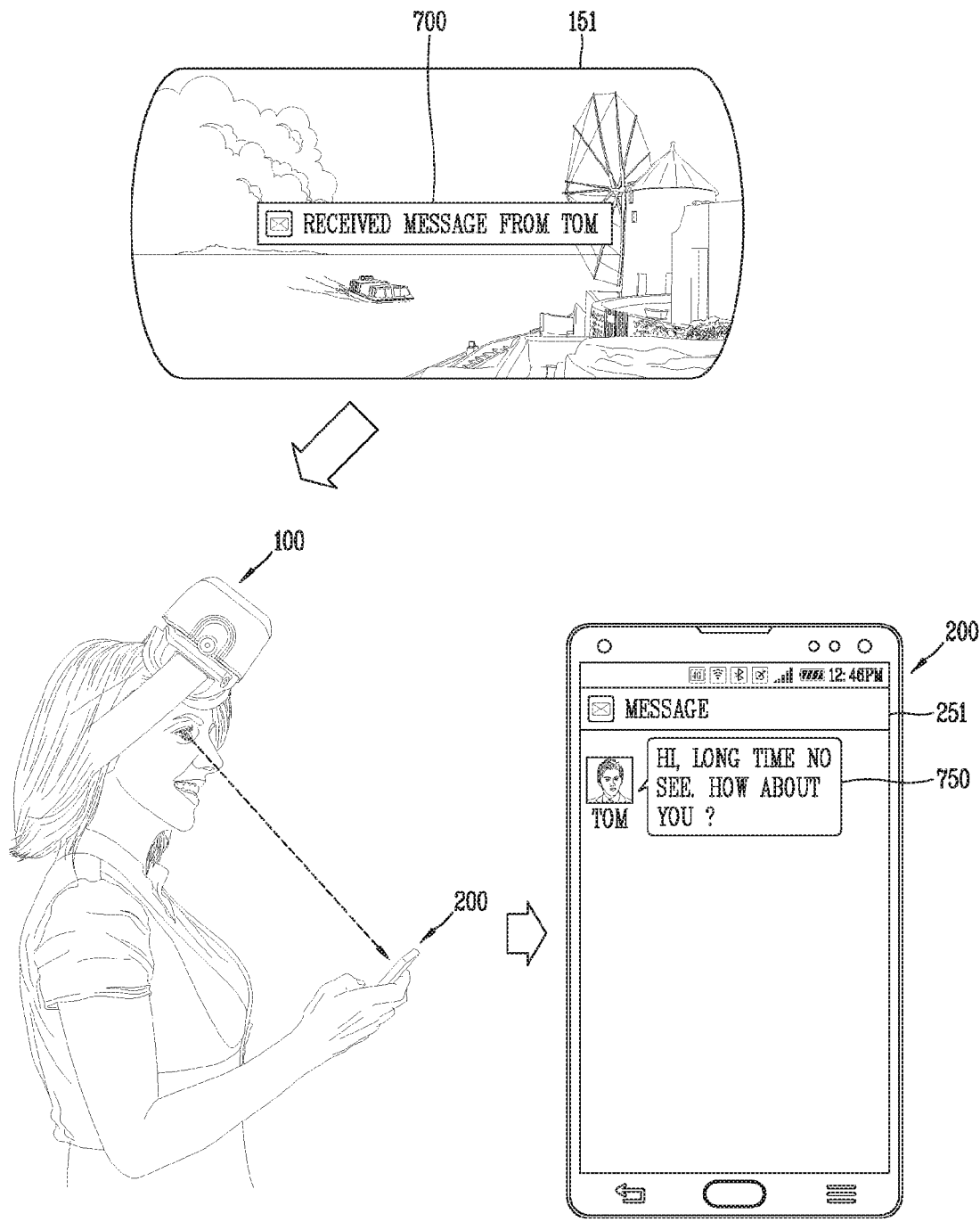
FIG. 7 is a view illustrating an example in which a controller device enters a specific operational state when an HMD related to the present disclosure is temporarily taken off.

FIG. 7 illustrates an example in which, when the HMD 100 is temporarily taken off (e.g., the HMD 100 is on the user's head but is positioned such that eye tracking sensor 142 cannot detect the user's eyes and shuts down) when presenting a notification regarding an event in mobile terminal 200, the mobile terminal 200 is controlled by the HMD 100 to enter a specific operational state associated with HMD 100 being temporarily taken off.

In the first portion of FIG. 7, it is illustrated that an image signal of played content and notification information are displayed on the display unit 151 when the user wears the HMD 100.

In the specific example shown in FIG. 7, when the user wears the HMD 100 and is viewing content via display unit 151 and a message is received by the mobile terminal 200 serving as a controller of the HMD 100, the controller 180 of the HMD 100 may detect that the mobile terminal 200 received the message. As illustrated in the first portion of FIG. 7, notification information 700 indicating that a message is received by mobile terminal 200 may be displayed on the display unit 151.

Consequently, the user may be notified, through the notification information 700, of the event, that is, reception of the message, that occurs in the mobile terminal 200 while the user is concurrently viewing displayed content. In this case, as illustrated in FIG. 7, when the user temporarily takes off the HMD 100 to check a function related to the event that currently occurs in the mobile terminal 200 or related detailed information, the controller 180 may detect a change in a worn-on state of the HMD 100. Here, as illustrated in the second drawing of FIG. 7, the HMD 100 is considered to be temporarily taken off because the user, although still wearing the HMD 100 on his or her head, changed repositioned the HMD 100 such that user's eyes are exposed to the outside of the HMD 100. In this case, the controller 180 may determine that the user is not currently looking at the display unit 151 of the HMD 100 according to a sensing result of the tracking sensor 142, and accordingly, controller 180 may determine that the HMD 100 is "temporarily taken off".

Meanwhile, as illustrated in the second portion of FIG. 7, when the HMD 100 is temporarily taken off while the notification information 700 is displayed (or during a threshold time period after the notification information 700 is displayed), the controller 180 may direct the mobile terminal 200 to enter an operational state related to the event identified in the notification information 700. For example, controller 180 may forward a signal directing the mobile terminal 200 to activate and associated application. Accordingly, in the displayed example in which the notification information 700 alerts the user about reception of a message, the controller 180 may control the mobile terminal 200 to enter an operational state in which a message-related function is performed. For example, controller 180 may direct mobile terminal 200 to present an application related to viewing the message, viewing metadata associated with the message, generating a reply to the message, viewing contact information regarding a sender of the message, viewing prior messages exchanged with the sender, presenting additional information related to the contents of the message, etc. Thus, as illustrated in the third portion of FIG. 7, contents 750 of the currently received message may be displayed on the display unit 251 of the mobile terminal 200, and a screen including various functions related to the received message may be also displayed.

Figure 8B:
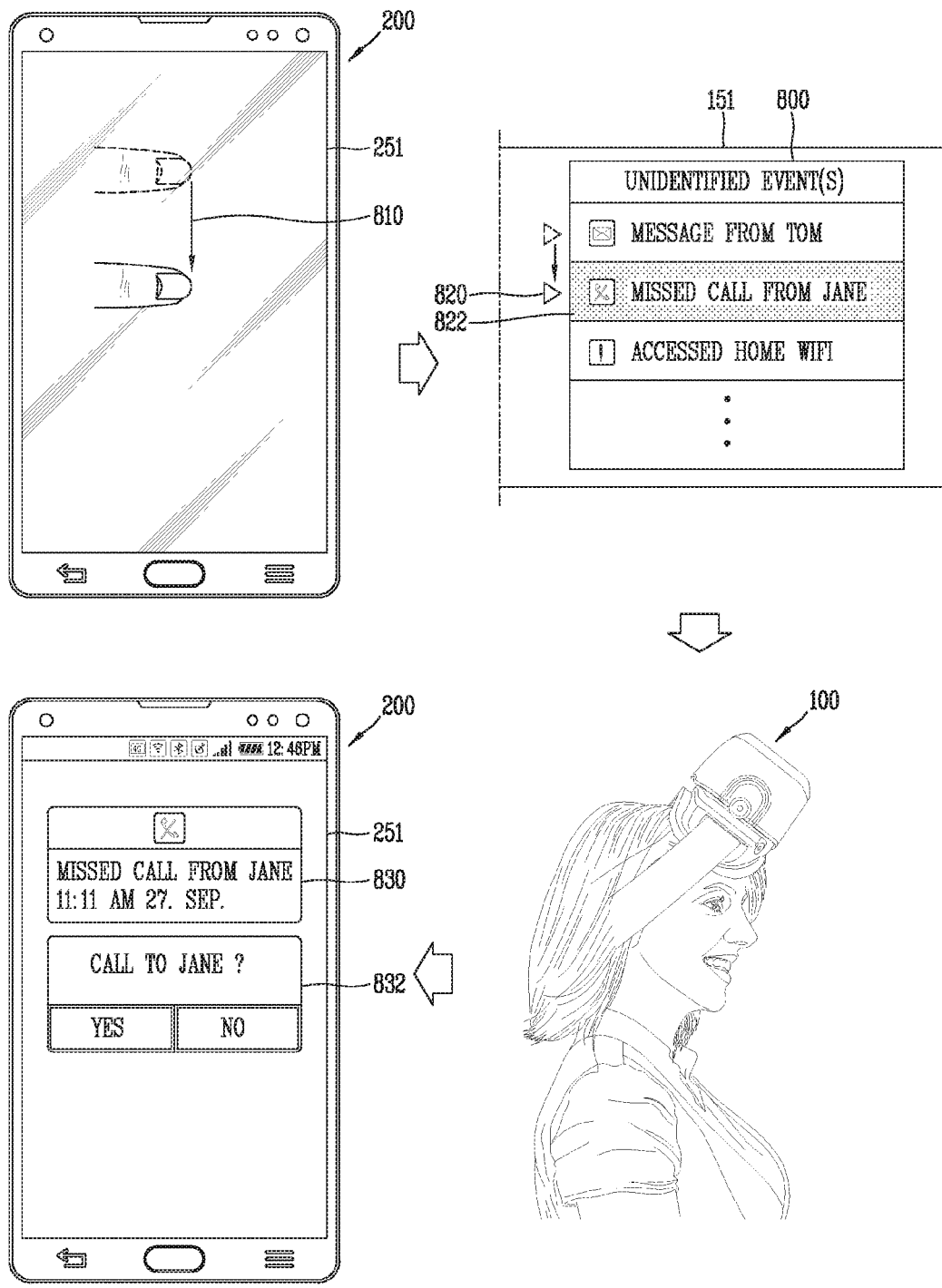

FIGS. 8A and 8B are views illustrating an example in which the mobile terminal 200 is controlled such that a specific notification information is selected and an operational screen corresponding to the selected notification information is displayed, in the HMD 100 related to the present disclosure.

As mentioned above, when notification information is displayed and a particular period of time has passed without action by the user (e.g., the user taking off the HMD 100 or submitting an input to the HMD 100), the HMD 100 according to an embodiment may terminate displaying of the notification information. Accordingly, if the user does not check events that have occurred, the unchecked events may continue to be accumulated. Here, the controller 180 may determine whether the events have been checked by the user, according, for example, to whether the user has changed a worn-on state of the HMD 100 while the corresponding notification information is being displayed. Here, when a preset user input is applied, the controller 180 may display accumulated information regarding the unchecked events. As used herein, an "unchecked" event may refer to event that occurs while the HMD 100 is worn by the user and before the user accesses an associated application in the mobile terminal 200 to view additional information and/or perform related actions related to the event.

The first portion of FIG. 8A illustrates an example in which the user applies a particular touch input through the mobile terminal 200 while the user wears the HMD 100. For example, as illustrated in the first portion of FIG. 8A, when at least one touch input applied to the touch screen is sensed, or when a user's touch input forming a preset pattern or trace is applied (e.g., the user contacts the touch screen of the mobile terminal 200 for at least a threshold amount of time, such as two seconds, and moves the contact position to perform a drag operation), the controller 180 may sense the touch input as a user input requesting the display of information regarding the unchecked events that have occurred during a particular time period (e.g., while the HMD 100 is continuously worn by the user).

Thus, as illustrated in the second portion of FIG. 8A, the controller 180 may display information 800 regarding the unchecked events accumulated so far on the display unit 151. For example, the information 800 regarding the unchecked events may be displayed in the form of a list as illustrated in the second portion of FIG. 8A and/or may be displayed as graphic objects that provide information differentiating the unchecked events. In the example shown in FIG. 8A, an event associated with an message may be represented by a graphical envelope, an event associated with missed call may be represented by a graphical telephone, and an event associated with a change of operational status or technical error in the mobile terminal 200 may be represented by a graphical alert signal, such as an exclamation symbol.

When the information 800 regarding the unchecked events is displayed on the display unit 151, the controller 180 may select any one of the unchecked events according to a user input. That is, as illustrated in the first portion of FIG. 8B, when the user applies a drag input 810 in a specific direction on the touch screen of the mobile terminal 200, the controller 180 may sense the drag input 810 as a user input for selecting a specific unchecked event. Additionally or alternatively, controller 180 may automatically (e.g., without a user input) select one of the unchecked events, such as to select a first occurring or most recent event, or applying a selection logic, such as selecting an event related to a change in the operational status of mobile terminal before an event related to a received message.

Accordingly, as illustrated in the second portion of FIG. 8B, the controller 180 may move a graphic object 820 for selecting one of the unchecked events identified in the information 800 based on the length over which the drag input 810 has been applied, in a direction in which the drag input 810 has been applied, etc. For example, when the drag input 810 is associated with a first contact distance, graphic object 820 may be moved to a next unchecked event, and when the drag input 810 is associated with a second, greater contact distance, graphic object 820 may be moved to select by two or more unchecked events. In the following description, the graphic object 820 will be termed an "indicator" for indicating notification information selected by the user.

Thus, the indicator 820 may be moved as illustrated in the second drawing of FIG. 8B, and a specific unchecked event 822 may be designated by the indicator 820 according to the movement of the indicator 820. In this case, the controller 180 may display the specific unchecked event 822 designated by the indicator 820 such that at least one of a background color, a letter shape, or a letter size thereof is differentiated from pieces of notification information of other unchecked events. In this way, the user may easily identify the currently selected specific unchecked event 822 to receive notification information regarding the highlighted event.

As previously described, after any one of the unchecked events is selected, the controller 180 may detect whether a worn-on state of the HMD 100 has been changed. When the user temporarily takes off the HMD 100, as illustrated in the third portion of FIG. 8B, the controller 180 may determine that the user has temporarily taken off the HMD 100 and may infer that the user has temporarily taken off the HMD 100 in order to check the mobile terminal 200 for information regarding the currently selected unchecked event.

Thus, the controller 180 may control the mobile terminal 200 to enter an operational state related to the currently selected unchecked event 822. In the specific example shown in FIG. 8B in which selected unchecked event 822 corresponds to a "Missed Call from Jane", the controller 280 of the mobile terminal 200 may switch the operational state of the mobile terminal 200 to an operational state in which a call function corresponding to an "absent call' is performed. Accordingly, as illustrated in the fourth portion of FIG. 8B, detailed information 830 related to the "absent call' and a call function related menu screen 832 allowing the user to make a return call to a caller of the absent call may be displayed on the display unit 251 of the mobile terminal 200.

Figure 9:
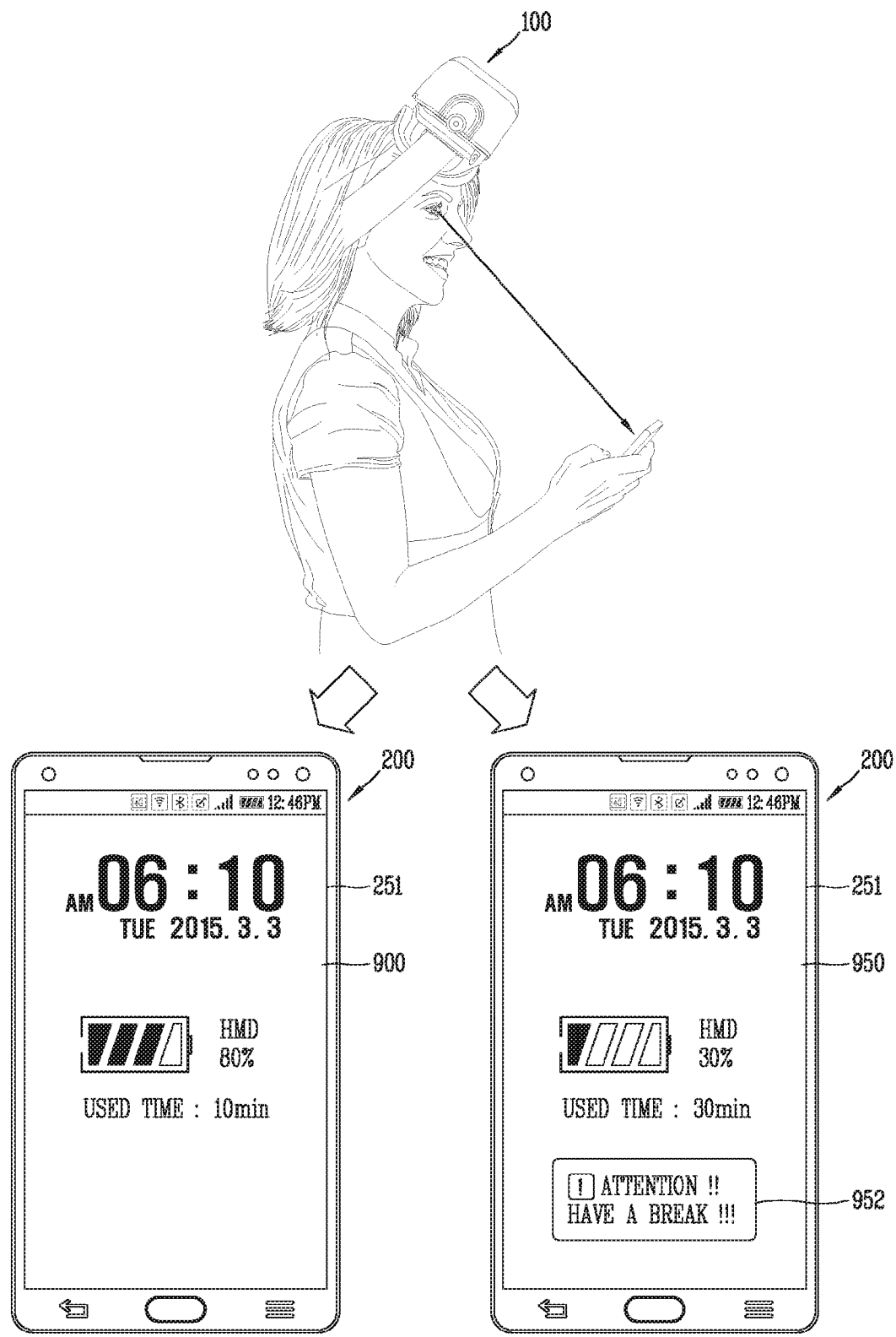
FIG. 9 is a view illustrating an example in which when an HMD related to the present disclosure is temporarily taken off, mutually different guide screens are displayed on a controller device according to a usage time of the HMD.

Thus, the user may temporarily take off the HMD 100, for example, to access the mobile terminal 200 to perform a function and/or receive information regarding the specific event. However, alternatively, the user may also takes off the HMD 100 even though an event has not occur, and the HMD 100, according to certain embodiments, may perform certain actions in this situation. FIG. 9 is a view illustrating an example in which, when the HMD 100 related to the present disclosure is temporarily taken off, the HMD 100 may direct the mobile terminal 200 to display different guide screens according to a usage time of the HMD 100.

First, a first portion of FIG. 9 illustrates an example in which when the user is viewing content through the HMD 100, the user temporarily takes off the HMD 100 regardless of occurrence of an event. For example, when the HMD 100 is temporarily taken off when there is no notification information indicating occurrence of an event and/or when there is no user input for selection among different unchecked events, the temporarily taking off of the HMD 100 may be unrelated to occurrence of an event.

In this case, the controller 180 may display various-types of information related to a current use of the HMD 100 on the display unit 251. For example, referring to the second portion of FIG. 9, a current battery capacity of the HMD 100 and information 900 regarding a time during which the user has used the HMD 100 during a current session may be displayed.

Meanwhile, when the time that the user has worn and used the HMD 100 exceeds a preset recommendation usage time, the controller 180 may further cause corresponding notification information to be presented on the display unit 251 of the mobile terminal 200. For example, when the user has used the HMD 100 for more than the recommendation usage time (e.g., the recommendation usage time is 20 minutes and a time that the user has used the HMD 100 is 30 minutes, as illustrated in the third portion of FIG. 9), the controller 180 may further direct the display unit 251 of the mobile terminal 200 to display a warning sentence 952 encouraging the user to have a break from using the HMD 100.

Meanwhile, as described above with respect to FIG. 3, when the HMD 100 is taken off when a certain function is being performed (e.g., content is being presented to the user), regardless of occurrence of an event, HMD 100 may perform certain actions related to the performed function. For instance, when the HMD 100 is partially taken off, the controller 180 of the HMD 100 may temporarily pause the playback of the currently content, and when the HMD is completely taken off, the controller 180 of the HMD 100 may generate and store bookmark information regarding currently played content.

Meanwhile, in the above description, when the user wears the HMD 100, a menu screen allowing the user to select continuous playing according to bookmark information or displaying of a home screen may be displayed according to whether there is bookmark information. FIG. 10 is a view illustrating an example thereof.

A first portion of FIG. 10 illustrates an example of a screen of the display unit 151 of the HMD 100 that is displayed when the user first wears the HMD 100 according to an embodiment. As used herein, the user may "first" wear the HMD 100 by putting on the HMD 100 after the HMD 100 is previously completely taken off while the user was wearing the HMD 100 to view content played. As previously described, controller 180 may determine that the HMD 100 is worn when the controller 180 of the HMD 100 detects that the user's head part is adjacent to the HMD 100 and the user's eyes are oriented toward the display unit 151 of the HMD 100 through the proximity sensor 141 and the eye tracking sensor 142.

In this manner, when the user first re-wears the HMD 100 after the HMD 100 is completely taken off, the controller 180 of the HMD 100 may check whether stored bookmark information exists. When stored bookmark information exists, the user may select to continue to play specific content according to the bookmark information from a point in time at which playing of the specific content was terminated or may select new content. To this end, as illustrated in the first portion of FIG. 10, the controller 180 of the HMD 100 according to an embodiment, may cause display unit 151 to display a menu screen 1000 that allows the user to select, for example, one of a "continue" option 1010 to resume playing the content from the prior use or and a "home"1012 to display a home screen on the display unit 151. Here, the user selection may be performed according to a user's touch gesture sensed from a touch screen of the mobile terminal 200 serving as a controller and/or from an input received by interface unit 160.

In the example shown in FIG. 10, the "continue" menu 1000 may be a menu for selecting continuously playing of a specific content according to previously stored bookmark information from a point in time at which playing of the content was terminated. The "point in time at which playing of the content was terminated" may correspond to a prior point in time at which the user completely took off the HMD 100, the function of the HMD 100 was terminated, and playing of the content was terminated. In another example, when the playing of content was temporarily stopped due to the user partially (or temporarily) taking off the HMD 100 and the HMD 100 is subsequently completely taken off so the content play function is terminated, the "point in time at which playing of the content was terminated" may correspond to a point in time at which playing of the content was temporarily stopped due to the HMD 100 being temporarily removed. For instance, the content playback may be paused at a particular portion of the content when the user moves HMD 100 to access mobile terminal 200, and bookmark information may identify this paused portion if the user subsequently completely takes off the HMD 100. Accordingly, when the user selects the "continue" menu 1010, the HMD 100 may resume presenting the prior content, and the playback of the prior content is resumed from a point in time at which playing was stopped as the user took off the HMD 100 (e.g., to resume presenting the portion of the content previously being presented when the prior playback was paused/stopped).

The second portion of FIG. 10 illustrates an example in which specific content is played continuously from a specific point in time according to previously stored bookmark information. Referring to the second portion of FIG. 10, when the "continue" option 1010 is selected, the controller 180 may select specific content corresponding to previously stored bookmark information and play the specific content from a specific point in time included in the bookmark information. In this case, a progress bar 1022 indicating a play time of the specific content and an indicator 1024 indicating a point in time at which playing of the specific content is started may be displayed on the display unit 151 of the HMD. Also, an image 1020 at a point in time at which playing is started according to bookmark information may be displayed on the display unit 151.

Meanwhile, in a case in which the user selects the "home" menu option 1012, the controller 180 of the HMD 100 may display a home screen including various functions available to be provided in the HMD 100 on the display unit 151. The third portion of FIG. 10 illustrates an example in which a home screen 1030 for the user to select at least one of various functions that may be provided in the HMD 100 is displayed. Through the home screen 1030, the user may select a function of the HMD 100 to be executed or selects new content to be viewed.

Thus, in certain examples, when the HMD 100 is completely taken off, the bookmark information generated by controller 180 may include information regarding played content and a point in time at which playing of the content was terminated, and when the "continue" menu option 1010 is selected, HMD 100 may resume playing the content is from the point in time at which playing of the content was terminated. However, in other examples, the controller 180 of the HMD 100 may also generate bookmark information associated with a different point in time (e.g., time that does not correspond to HMD 100 being completely taken off, and HMD 100 may resume playing the content at this different point in time.

For example, when playing of content is terminated due to the HMD 100 being completely taken off, the controller 180 may include, in the bookmark information, information regarding a time before a point in time at which playing of the content as terminated (e.g., when the HMD 100 was completely taken off) by a particular offset amount of time. In this example, the when controller 180 detects that the HMD 100 is completely removed, the controller 180 may generate and store bookmark information that includes information identifying content being played when the HMD 100 is removed and a point time that occurs a given before removal of the HMD 100 is detected.

Thus, in an example in which the controller 180 detects the removal of the HMD 100 and stops the playing of the content after the content was played for 15 minutes and 30 seconds and the preset offset time is one minute, when the user selects to continue playing from the prior stopped position, HMD 100 may resume presenting a portion of the corresponding content that corresponds to a point in time which is 14 minutes and 30 seconds from the beginning of the content (i.e., one minute prior to the detected complete removal of HMD 100). Here, the preset time may be changed according to a user selection and/or based on detected user behavior. For example, controller 180 may determine an average amount of time that the user rewinds the content when playback is resumed, and controller 180 may determine the offset based on this average amount of rewind time.

Controller 180 may use the present offset time because, there may be a difference between a point in time at which the user actually takes off the HMD 100 and a point in time at which the controller 180 detects the user taking off of the HMD 100. Additionally, when the playing of content is abruptly terminated and playback of the content is subsequently resumed, the user may want the content is played from a time ahead of the point in time at which playing of the content was terminated to reduce an influence from the interruption of content viewing. For example, resuming the playback from a prior point in time to replay a portion of the content may help the user recall other presented portions of the content.

As previously described, controller 180 may generate the bookmark information when the HMD 100 is completely taken off. In other examples, the controller 180 may also generate and store the bookmark information may when a preset time has lapsed since the HMD 100 began presenting the content and/or since prior bookmark information was generated, regardless of whether the HMD 100 is taken off. For example, controller 180 may generate bookmark information each time the user views a 10 minute section of the content (e.g., after 10, 20, 30, etc. minutes of presenting the content). In this case, when playing of content has started, the controller 180 may generate bookmark information when the preset time has first lapsed, and thereafter, whenever the preset time has lapsed, the controller 180 may update the bookmark information. In this case, updating of the bookmark information may be performed until playing of the content is terminated.

Meanwhile, after playing of the content is terminated before play time expires as the HMD 100 is completely taken off, when it is detected that the user wears the HMD 100 again, the controller 180 may display a home screen allowing the user to continuously play the content or select new content according to a user select regarding the menu screen 1000, or the like. Here, when the continuous playing of content is selected, the controller 180 may play the corresponding content from a specific point in time according to bookmark information which has been lastly updated. For example, controller 180 may not detect when the HMD 100 is removed, or the HMD may inadvertently stop playing back the content due to a technical error, such as a power loss or a loss of communications with mobile terminal 200. When directed by the user, the controller 180 may then resume the playback of the content from a last bookmarked point in time.

Meanwhile, when the user changes content being played to play new content, the controller 180 may delete bookmark information regarding the previously played content, and may generate new bookmark information regarding the newly played content. Also, when the HMD 100 completes the playback of a given content (e.g., the user views the entirety of that content), the controller 180 may delete the bookmark information which has been generated for that content.

Effects of the HMD 100 and the method for controlling the HMD 100 according to the present disclosure will be described.

According to at least one of the embodiments of the present disclosure, when the HMD 100 is taken off, bookmark information including information regarding currently played content and information regarding a point in time at which the HMD 100 is taken off is generated, and thus, when the user wears the HMD 100 again, the content which has been viewed may be continuously viewed.

Also, according to at least one of the embodiments of the present disclosure, in a case in which the user temporarily takes off the HMD 100, currently played content is maintained in a suspended state until the user wears the HMD 100 again, whereby playing of the content resumes.

Also, according to at least one of the embodiments of the present disclosure, in a case in which the user temporarily takes off the HMD 100 in order to check an event that occurs in a device serving as a controller, an operational screen corresponding to the generated event is immediately displayed on the device (such as mobile terminal 200) serving as the controller, whereby the user may easily and conveniently check the information related to the event.

The present specification described above may be implemented as a computer-readable code in a medium in which a program is recorded. The computer-readable medium includes any-type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present specification.

The foregoing embodiments and advantages are merely exemplary and are not to be considered as limiting the present disclosure. The present teachings can be readily applied to other-types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Therefore, an aspect of the detailed description is to provide a head-mounted display (HMD) devised such that, when a user, who is viewing content through the HMD, takes off the HMD, an influence of the removal of the HMD is minimized, and a method for controlling the same.

To achieve these and other advantages and in accordance with the purpose of this specification, as embodied and broadly described herein, a head-mounted display (HMD) connected to a mobile terminal may include: a display unit configured to display an image signal and notification information indicating occurrence of an event detected in the mobile terminal; a sensing unit configured to sense a state in which the HMD is worn; and a controller configured to, when a worn-on state of the HMD is changed in a state in which the notification information is displayed, temporarily stop playing of content or terminate a function of the HMD, wherein when the function of the HMD is terminated, the controller stores bookmark information including information regarding the played content and information regarding a time duration in which the content had been played up to a point in time at which the worn-on state of the HMD was changed.

In an embodiment of the present disclosure, the sensing unit may include a proximity sensor configured to sense whether a user's head part is adjacent to the HMD, and an eye tracking sensor configured to detect whether the pupils of the user's eyes can be tracked, wherein the controller may determine whether the HMD has been completely taken off from the user's head part or whether the HMD has been temporarily taken off according to sensing results from the proximity sensor and the eye tracking sensor, and when the HMD has been temporarily taken off, the controller may temporarily stop playing of the content, and when the HMD has been completely taken off, the controller may store the bookmark information and terminates the function of the HMD.

In an embodiment of the present disclosure, whether to turn on or turn off the proximity sensor may be determined according to whether the HMD is adjacent to the user's head part, and whether to turn on and off the eye tracking sensor may be determined whether the pupils of the user's eyes can be tracked, and when both the proximity sensor and the eye tracking sensor are turned on, the controller may determine that the user has completely worn the HMD, when both the proximity sensor and the eye tracking sensor are turned off, the controller may determine that the user has completely taken off, and when the eye tracking sensor is turned off in a state in which the proximity sensor is turned on, the controller may determine that the HMD is temporarily taken off.

In an embodiment of the present disclosure, when it is sensed that the user wears the HMD again in a state in which the HMD has been completely taken off, according to the sensing results from the sensing unit, the controller may display a selection menu allowing the user to select continuous playing of a specific content according to the bookmark information from a specific point in time according to time information included in the bookmark information or displaying of a home screen for selecting new content, on the display unit.

In an embodiment of the present disclosure, the bookmark information includes information regarding the played content and information regarding a time duration in which the content has been played to a point in time which is ahead by a preset period of time from a point in time at which a worn-on state of the HMD was changed, and when continuous playing of the content is selected, the controller plays the content according to the bookmark information from the point in time which is ahead by the preset period of time from the point in time at which the worn-on state of the HMD was changed.

In an embodiment of the present disclosure, the preset period of time may be adjusted by the user.

In an embodiment of the present disclosure, the controller may display the selection menu on the display unit according to whether there is previously stored bookmark information.

In an embodiment of the present disclosure, in a state in which the notification information is displayed, when the state in which the HMD is taken off is changed to a state in which the HMD is temporarily taken off or to a state in which the HMD is completely taken off, the controller may control the mobile terminal to enter an operational state related to an event corresponding to currently displayed notification information.

In an embodiment of the present disclosure, when a predetermined period of time has lapsed since content started to be played, the controller may generate the bookmark information and update the bookmark information at every predetermined period of time until playing of the content is terminated.

In an embodiment of the present disclosure, when playing of the specific content is terminated as a play time thereof expires, the controller may delete bookmark information corresponding to the specific content.

In an embodiment of the present disclosure, according to whether it is detected that a worn-on state of the HMD is changed in a state in which the notification information is displayed, the controller may determine whether the user has checked the event corresponding to the notification information.

In an embodiment of the present disclosure, when the preset period of time has lapsed without a change in the worn-on state of the HMD in a state in which the notification information is displayed, the controller may terminate displaying of the notification information and determine an event corresponding to the notification information whose displaying has been terminated, as an unchecked event.

In an embodiment of the present disclosure, when a user input is applied, the controller may display pieces of notification information respectively corresponding to unchecked events which have been accumulated until the user input is applied, on the display unit.

In an embodiment of the present disclosure, when the pieces of notification information are displayed, the controller may distinguishingly display any one of the pieces of displayed notification information, and when a worn-on state of the HMD is changed, the controller may control the mobile terminal to enter an operational state according to an event corresponding to the any one distinguishably displayed notification information.

In an embodiment of the present disclosure, the controller may distinguishably display any one of the pieces of displayed notification information according to a user input by differentiating at least one of a preset graphic object, background color, character shape, and character size.

In an embodiment of the present disclosure, the user input may be applied through the mobile terminal.

In an embodiment of the present disclosure, when a user input is applied in a state in which displaying of the notification information is terminated, the controller may control the mobile terminal to display a list of pieces of notification information respectively corresponding to unchecked events which have been accumulated until the user input is applied, on a display unit provided in the mobile terminal.

In an embodiment of the present disclosure, when a change in a worn-on state of the HMD is detected in a state in which the notification information is not displayed, the controller may control the mobile terminal to display information regarding a state of the HMD and a state related to a time duration in which the HMD was used, on a display unit provided in the mobile terminal.

In an embodiment of the present disclosure, when a time duration in which the user has used the HMD exceeds a preset period of time, the controller may further output notification information informing the user that the usage time of the HMD has exceeded the preset period of time.

To achieve these and other advantages and in accordance with the purpose of this specification, as embodied and broadly described herein, a method for controlling a head-mounted display (HMD) connected to a mobile terminal may include: detecting an event that occurs in the mobile terminal and displaying notification information corresponding to the detected event; sensing whether the HMD is taken off; when the HMD is taken off, temporarily stopping currently played content or storing bookmark information including information regarding the currently played content and a time duration in which the content has been played until the HMD is taken off; controlling the mobile terminal to enter an operational state related to the event corresponding to the notification information; and when the user wears the HMD again, displaying a preset menu screen or continuously playing the temporarily stopped content, wherein the preset menu screen allows the user to select continuously playing specific content from a specific point in time according to the bookmark information or displaying of a home screen for selecting new content.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A head-mounted display (HMD) in communications with a mobile terminal, the HMD comprising:
   a display configured to selectively present content;
   a sensor configured to sense a state in which the HMD is worn by a user; and
   a controller configured to:
      present, on the display, notification information about an event detected by the mobile terminal,
      when the sensor senses a change in the state in which the HMD is worn by the user while the notification information is being presented by the display, pause the presentation of the content on the display, and
      generate, based on pausing the presentation of the content on the HMD, bookmark information identifying the content and a point in time when the sensor senses the change in the state in which the HMD is worn by the user,
   wherein the sensor includes:
      a proximity sensor configured to sense whether the user's head is adjacent to the HMD, and
      an eye tracking sensor configured to detect whether the user's eyes can be tracked, and
   wherein the controller is further configured to:
      determine that the HMD has been completely taken off when the proximity sensor senses that the user's head is not adjacent to the HMD,
      determine that the HMD has been temporarily taken off when the proximity sensor senses that the user's head is adjacent to the HMD and the eye tracking sensor detects that the user's eyes cannot be tracked,
when the HMD has been temporarily taken off while the notification information is not being displayed, direct the display to pause the presenting of the content, and
when the HMD has been completely taken off, direct the display to stop presenting the content and generate the bookmark information.

2. The HMD of claim 1, wherein the controller is further configured to:
activate the proximity sensor when the HMD is positioned within a threshold distance of the user's head,
activate the eye tracking sensor when the HMD is positioned on the user's head for the display to present the content to the user's eyes,
determine, when the proximity sensor and the eye tracking sensor are activated, that the user is wearing the HMD,
determine, when the proximity sensor and the eye tracking sensor are deactivated, that the user has completely taken off the HMD, and
determine, when the eye tracking sensor is deactivated while the proximity sensor is activated, that the user has temporarily taken off the HMD.

3. The HMD of claim 1, wherein the controller is further configured to:
when the user wears the HMD again after the HMD was completely taken off, present, on the display, a selection menu, wherein the selection menu enables to the user to direct the HMD to resume presenting the content according to the bookmark information or to select new content to be presented by the HMD.

4. The HMD of claim 3, wherein the controller is further configured to:
when the user wears the HMD and the bookmark information is not generated, present, on the display, an alternative selection menu, wherein the alternative selection menu enables the user to select the new content to be presented by the HMD, and wherein the alternative selection menu does not include an option for the HMD to resume presenting the content.

5. The HMD of claim 1, wherein the controller is further configured to:
resume presenting the content on the display based on the bookmark information, wherein the presentation of the content is resumed at a portion of the content being presented during a particular period of time before the point in time when the sensor sensed the change in the state in which the HMD is worn by the user.

6. The HMD of claim 5, wherein the controller is further configured to:
receive a user input, and
adjust the particular period of time based on the user input.

7. The HMD of claim 1, wherein the controller is further configured to:
cause, when the sensor senses the change in the state in which the HMD is worn by the user while the notification information is being presented by the display, the mobile terminal to enter an operational state related to the event.

8. The HMD of claim 1, wherein the controller is further configured to:
generate the bookmark information when a predetermined time elapses after the content is presented, and update the bookmark information to include data indicating that the content was presented at predetermined time intervals until the presentation of the content is completed.

9. The HMD of claim 8, wherein the controller is further configured to:
delete the bookmark information when the presentation of the content is completed.

10. The HMD of claim 1, wherein the controller is further configured to:
determine, when the sensor senses the change in the state in which the HMD is worn by the user while the notification information is being presented by the display, that the user has checked the event corresponding to the notification information.

11. The HMD of claim 10, wherein the controller, when the sensor does not sense the change in the state in which the HMD is worn by the user while the notification information is being presented on the display during a particular duration of time, is further configured to:
stop presenting, on the display, the notification information after the particular duration of time, and
designate the event as an unchecked event.

12. The HMD of claim 11, wherein the controller is further configured to:
when a particular user input is detected, present, on the display, information related to a group of unchecked events that includes the unchecked event and one or more other unchecked events.

13. The HMD of claim 12, wherein the controller is further configured to:
receive a user selection identifying one of the group of unchecked events,
visually distinguish, on the display, a portion of the presented information associated with the identified one of the group of unchecked events, and
cause, when the sensor senses the change in the state in which the HMD is worn by the user while the display is visually distinguishing the portion of the presented information, the mobile terminal to enter an operational state related to the identified one of the group of unchecked events.

14. The HMD of claim 13, wherein the controller, when visually distinguishing the portion of the presented information associated with the identified one of the group of unchecked events, is further configured to:
modify at least one of:
a graphic object associated with the portion of the presented information,
a background color associated with the portion of the presented information,
a character shape associated with the portion of the presented information, or
a character size associated with the portion of the presented information.

15. The HMD of claim 12, wherein the particular user input is applied through the mobile terminal.

16. The HMD of claim 11, wherein the controller is further configured to:
cause, based on detecting a particular user input after the display stops presenting the notification information, the mobile terminal to display information related to a group of unchecked events that includes the unchecked event and one or more other unchecked events.

17. The HMD of claim 1, wherein, when the sensor senses the change in the state in which the HMD is worn by the user while the notification information is not being displayed, the controller is further configured to:
cause the mobile terminal to display information identifying a state of the HMD and a time duration in which the HMD was used.

18. The HMD of claim 17, wherein, when the time duration in which the user used the HMD exceeds a particular duration of time, the controller is further configured to:
present, on the display, a notification informing the user that the time duration in which the user used the HMD has exceeded the particular duration of time.

19. A method for controlling a head-mounted display (HMD) in communications with a mobile terminal, the method comprising:
detecting an event that occurs in the mobile terminal,
displaying, on the HMD, content and notification information corresponding to the detected event;
sensing whether the HMD is taken off while the notification information is being displayed;
when the HMD is taken off while the notification information is being displayed, pausing the display of the content and generating bookmark information identifying the content and a portion of the content that was displayed before the HMD is taken off;
controlling the mobile terminal to enter an operational state related to the event;
when the user wears the HMD again, resuming, based on the bookmark information, the display of the content, and
wherein sensing whether the HMD is taken off while the notification information is being displayed further includes:
sensing whether the user's head is adjacent to the HMD, and
detecting whether the user's eyes can be tracked, and
wherein pausing the display of the content and generating the bookmark information further includes:
determining that the HMD has been completely taken off when the user's head is not adjacent to the HMD or determining that the HMD has been temporarily taken off when the user's head is adjacent to the HMD and the user's eyes cannot be tracked, and
pausing the displaying of the content when the HMD has been temporarily taken off while the notification information is not being displayed, or stopping the displaying of the content and generating the bookmark information when the HMD has been completely taken off.

* * * * *